US006028693A

United States Patent [19]
Fork et al.

[11] Patent Number: 6,028,693
[45] Date of Patent: Feb. 22, 2000

[54] MICRORESONATOR AND ASSOCIATED METHOD FOR PRODUCING AND CONTROLLING PHOTONIC SIGNALS WITH A PHOTONIC BANDGAP DELAY APPARATUS

[75] Inventors: Richard Lynn Fork; Darryl Keith Jones; Andrew Scott Keys, all of Madison County, Ala.

[73] Assignees: University of Alabama in Huntsville, Huntsville, Ala.; The United States of America as represented by the Administrator of the National Aeronautics and Space Administration, Washington, D.C.

[21] Appl. No.: 09/007,124

[22] Filed: Jan. 14, 1998

[51] Int. Cl.[7] ............................... G02F 1/03; G02B 1/10; G02B 5/28; G02B 6/12
[52] U.S. Cl. .......................... 359/248; 359/260; 359/263; 359/586; 359/587; 359/588; 359/589; 385/14; 385/122
[58] Field of Search ...................... 359/260, 263, 359/245, 278, 248, 586–589, 250, 264, 331; 385/14, 122

[56] References Cited

U.S. PATENT DOCUMENTS

| H1182 | 5/1993 | Spry | 359/588 |
|---|---|---|---|
| 3,410,625 | 11/1968 | Edwards | 359/588 |
| 3,637,294 | 1/1972 | Berthold, III | 359/588 |
| 3,697,153 | 10/1972 | Zycha | 359/588 |
| 3,706,485 | 12/1972 | Fawcett et al. | 359/588 |
| 3,759,604 | 9/1973 | Thelen | 359/588 |
| 3,853,386 | 12/1974 | Ritter et al. | 359/588 |
| 3,914,023 | 10/1975 | Thelen | 359/588 |
| 4,441,789 | 4/1984 | Pohlack | 359/588 |
| 4,726,655 | 2/1988 | Mahlein | 359/588 |
| 4,756,602 | 7/1988 | Southwell et al. | 359/588 |
| 4,770,496 | 9/1988 | Mahlein | 359/588 |
| 5,148,504 | 9/1992 | Levi et al. | 385/14 |
| 5,179,468 | 1/1993 | Gasloli | 359/588 |
| 5,315,437 | 5/1994 | Alfano et al. | 359/588 |
| 5,414,726 | 5/1995 | Raj et al. | 359/260 |
| 5,448,404 | 9/1995 | Schrenk et al. | 359/584 |
| 5,559,825 | 9/1996 | Scalora et al. | 359/584 |
| 5,751,466 | 5/1998 | Dowling et al. | 359/248 |
| 5,907,427 | 5/1999 | Scalora et al. | 359/248 |

OTHER PUBLICATIONS

Liddell, *Basic Theory And Notation For Multilayer Filter Calculations*, Chapter 1, Adam Hilger, Ltd., Bristol, 1981.

Yariv, et al., *Optical Waves In Crystals: Propagation And Control Of Laser Radiation*, John Wiley & Sons, 1984, pp. 439, 442, 444–447.

Sprung, et al., Scattering By A Finite Periodic Potential, *Am. J. Phys.*, vol. 61, No. 12, Dec. 1993, pp. 1118–1124.

Dowling, et al., The Photonic Band Edge Laser: A New Approach To Gain Enhancement, *J. Appl. Phys.*, vol. 75, No. 4, Feb. 15, 1994, pp. 1896–1899.

(List continued on next page.)

*Primary Examiner*—Georgia Epps
*Assistant Examiner*—Evelyn A. Lester
*Attorney, Agent, or Firm*—Alson & Bird LLP

[57] ABSTRACT

By applying a photonic signal to a microresonator that includes a photonic bandgap delay apparatus having a photonic band edge transmission resonance at the frequency of the photonic signal, the microresonator imparts a predetermined delay to the photonic signal. The photonic bandgap delay apparatus also preferably has a photonic band edge transmission resonance bandwidth which is at least as wide as the bandwidth of the photonic signal such that a uniform delay is imparted over the entire bandwidth of the photonic signal. The microresonator also includes a microresonator cavity, typically defined by a pair of switchable mirrors, within which the photonic bandgap delay apparatus is disposed. By requiring the photonic signal to oscillate within the microresonator cavity so as to pass through the photonic bandgap delay apparatus several times, the microresonator can controllably impart an adjustable delay to the photonic signal.

37 Claims, 11 Drawing Sheets

OTHER PUBLICATIONS

Scalora, et al., The Photonic Band Edge Optical Diode, *J. Appl. Phys.*, vol. 76, No. 4, Aug. 15, 1994, pp. 2023–2026.

Scalora, et al., Optical Limiting And Switching Of Ultrashort Pulses In Nonlinear Photonic Band Gap Materials, *Physical Review Letters*, vol. 73, No. 10, Sep. 5, 1994, pp. 1368–1371.

Scalora, et al., *A Beam Propagation Method That Handles Reflections*, Optics Communications, vol. 108, 1994, pp. 191–196.

Tocci, et al., *Thin–Film Nonlinear Optical Diode*, Appl. Phys. Lett., vol. 66, No. 18, May 1, 1995, pp. 2324–2326.

Scalora, et al., *Pulse Propagation Near Highly Reflective Surfaces: Applications To Photonic Band–Gap Structures And The Question Of Superluminal Tunneling Times*, Physical Review A, vol. 52, No. 1, Jul. 1995, pp. 726–734.

Scalora, et al., *Dipole Emission Rates In One–Dimensional Photonic Band–Gap Materials*, Appl. Phys. B, vol. 60, 1995, pp. S57–S61.

Hargrove, et al., *Locking Of He–Ne Laser Modes Induced By Synchronous Intracavity Modulation*, Applied Physics Letters, vol. 5, No. 1, Jul. 1, 1964, pp. 4–5.

Fork, et al., *Generation Of Optical Pulses Shorter Than 0.1 psec By Colliding Pulse Mode Locking*, Applied Physics Letters, vol. 38, No. 9, May 1, 1981, pp. 671–672.

Fork, *Physics Of Optical Switching*, Physical Review A, vol. 26, No. 4, Oct. 1982, pp. 2049–2064.

Fork, et al., *Negative Dispersion Using Pairs Of Prisms*, Optics Letters, vol. 9, May 1984, pp. 150–152.

Martinez, et al., *Negative Group–Velocity Dispersion Using Refraction*, Journal Of The Optical Society Of America A, vol. 1, Oct. 1984, pp. 1003–1006.

Valdmanis, et al., *Generation Of Optical Pulses As Short As 27 Femtoseconds Directly From A Laser Balancing Self–Phase Modulation*, Group–Velocity Dispersion, Saturable Absorption, And Saturable Gain, Optical Letters, vol. 10, Mar. 1985, pp. 131–133.

Martinez, et al., *Theory Of Passively Mode–Locked Lasers For The Case Of A Nonlinear Complex–Propagation Coefficient*, Optical Society Of America B, vol. 2, May 1985, pp. 753–760.

Lowery, *Integrated Mode–Locked Laser Design With A Distributed–Bragg Reflector*, IEE Proceedings–J, vol. 138, No. 1, Feb. 1991, pp. 39–46.

Orenstein, et al., *Matrix Addressable Vertical Cavity Surface Emitting Laser Array*, Electronics Letters, vol. 27, No. 5, Feb. 28th, 1991, pp. 437–438.

Haus, *Short Pulse Generation*, Compact Sources Of Ultrashort Pulses, pp. 1–56. (1993).

Jiang, et al., *Ultrafast Vertical Cavity Semiconductor Lasers*, Compact Sources Of Ultrashort Pulses, pp. 209–273. (1993).

Delfyett, *High Power Ultrafast Semiconductor Injection Diode Lasers*, Compact Sources Of Ultrashort Pulses, pp. 276–328. (1993).

Wu, et al., *Monolithic Colliding Pulse Modelocked Diode Lasers*, Compact Sources Of Ultrashort Pulses, pp. 383–424. (1993).

Jiang, et al., *Analysis Of Laser Pulse Chirping In Mode–Locked Vertical–Cavity Surface–Emitting Lasers*, Journal Of Quantum Electronics, vol. 29, No. 5, May 1993, pp. 1309–1318.

Blum, et al., *Low–Voltage–Tunable Distributed Bragg Reflector Using InGaAs/GaAs Quantum Wells*, IEEE Photonics Technology Letters, vol. 5, No. 6, Jun. 1993, pp. 695–697.

Esman, et al., *Fiber–Optic Prism True Time–Delay Antenna Feed*, IEEE Photonics Technology Letters, vol. 5, No. 11, Nov. 1993, pp. 1347–1349.

Phelan, et al., *Comparison Of Self–Pulsation In Multisection Lasers With Distributed Feedback And Intracavity Saturable Absorbers*, IEE Prox.–Optoelectron, vol. 141, No. 2, Apr. 1994, pp. 114–118.

Richie, et al., *Chaotic Dynamics Of Mode Competition In A Vertical–Cavity Surface Emitting Laser Diode Under DC Excitation*, IEEE Journal Of Quantum Electronics, vol. 30, No. 11, Nov. 1994, pp. 2500–2506.

Sun, et al. *Beam Steerable Semiconductor Lasers With Large Steering Range And Resolvable Sports*, Electronics Letters, vol. 30, No. 24, Nov. 24th, 1994, pp. 2034–2035.

Nugent, et al., *Self–Pulsations In Vertical–Cavity Surface–Emitting Lasers*, Electronics Letters, vol. 31, No. 1, Jan. 5th, 1995, pp. 43–44.

Fiedler, et al., *Design Of VCSEL's For Feedback Insensitive Data Transmission And External Cavity Active Mode–Locking*, IEEE Journal Of Selected Topics In Quantum Electronics, vol. 1, No. 2, Jun. 1995, pp. 442–450.

Morgan, et al., *Vertical–Cavity Surface–Emitting Laser Arrays*, SPIE, vol. 2398, Sep. 1995, pp. 65–93.

Lu, et al., *Optically–Cascaded, Multistage Switching Operation Of A Multifunctional Binary Optical/Optoelectronic Switch*, IEEE Photonics Technology Letters, vol. 7, No. 12, Dec. 1995, pp. 1427–1429.

Egan, et al., *Theoretical Investigations Of Electro–Optical Synchronization Of Self–Pulsating Laser Diodes*, IEE Proc.–Optoelectron, vol. 143, No. 1, Feb. 1996, pp. 31–36.

Choquette, et al., *Self–Pulsing Oxide–Confined Vertical–Cavity Lasers With Ultralow Operating Current*, Electronics Letters, vol. 32, No. 5, Feb. 29th, 1996, pp. 459–460.

Sandusky, et al., *A CW External–Cavity Surface–Emitting Laser*, IEEE Photonics Technology Letters, vol. 8, No. 3, Mar. 1996, pp. 313–315.

Huffaker, et al., *Fabrication Of High–Packing–Density Vertical Cavity Surface–Emitting Laser Arrays Using Selective Oxidation*, IEEE Photonics Technology Letters, vol. 8, No. 5, May 1996, pp. 596–598.

Scalora, et al., *Ultrashort Pulse Propagation At The Photonic Band Edge: Large Tunable Group Delay With Minimal Distortion And Loss*, Physical Review E, vol. 54, No. 2, Aug. 1996, pp. R1078–R1081.

Brorson, et al., *Femtosecond Carrier Dynamics And Modelocking In Monolithic CMP Lasers*, IEEE Photonics Technology Letters, vol. 8, No. 10, Oct. 1996, pp. 1308–1310.

Fork, et al., *Physics Of Excitations Of A Small Number Of Quanta In Microresonators*, SPIE, vol. 2994, 1997, pp. 287–299.

Law, et al., *Effects Of Optical Feedback On Static And Dynamic Characteristics Of Vertical–Cavity Surface–Emitting Lasers*, IEEE Journal Of Selected Topics In Quantum Electronics, vol. 3, No. 2, Apr. 1997, pp. 353–358.

*Photonic Band Edge Delay Lines For True Time Delay*, Conference Proceedings LEOS '97, 10th Annual Meeting, IEEE Lasers And Electro–Optics Society 1997 Annual Meeting, Nov. 10–13, 1997, pp. 393–394.

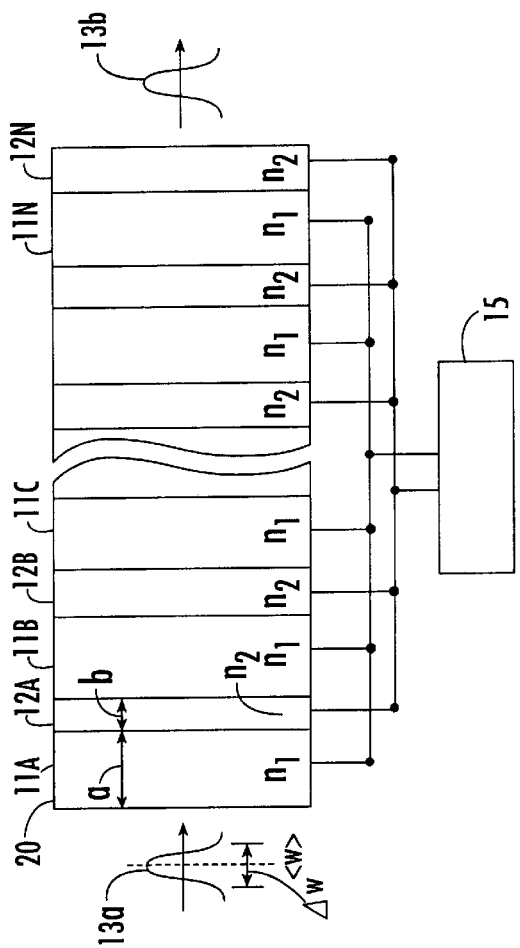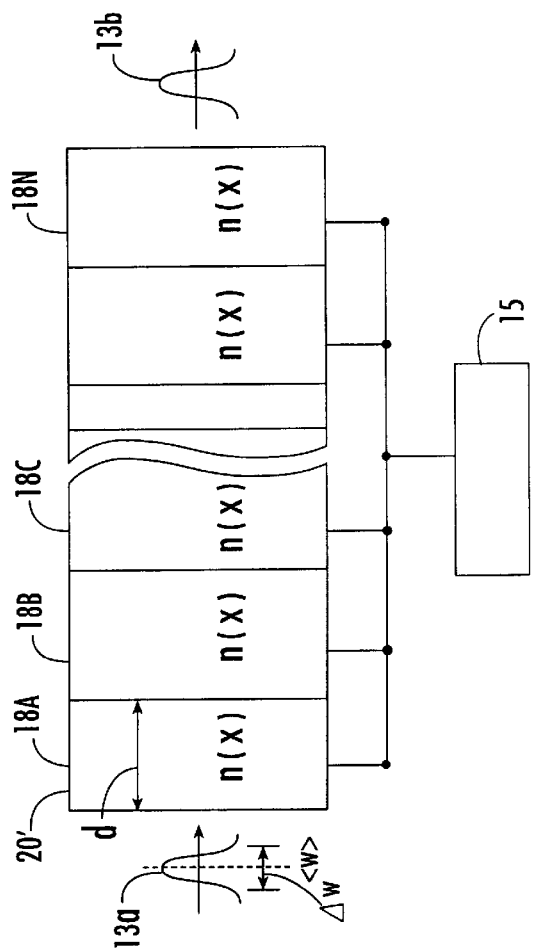

MICRORESONATOR AND ASSOCIATED METHOD FOR PRODUCING AND CONTROLLING PHOTONIC SIGNALS WITH A PHOTONIC BANDGAP DELAY APPARATUS

FIELD OF THE INVENTION

This invention relates to producing and/or processing of photonic signals, and more particularly to delaying of photonic signals.

BACKGROUND OF THE INVENTION

Photonic signals are widely used for data processing and communications applications. As is well known to those having skill in the art, photonic signals include electromagnetic signals such as optical signals, x-ray signals and microwave signals. Because of their enhanced properties compared to conventional electrical signals, photonic signals are widely being investigated as replacements for electrical signals in data processing and communications applications. Thus, for example, optoelectronic devices are replacing conventional electrical devices, and optical interconnections are replacing electrical interconnections in data processing systems.

A major building block of a system which uses photonic signals is a delay block. Low distortion, controllable delays are generally required to synchronize photonic signals. Moreover, a delay apparatus and method is also required for applications such as information processing, phased array antennas, information routing, and other applications in the telecommunications, commercial, consumer and military fields. For example, phased away antennas must be increasingly agile which places even greater demands upon the precision and controllability of photonic signal delays.

A high quality delay apparatus and method should provide a large, controllable delay for short photonic pulses. In particular, for a photonic pulse signal having a predetermined frequency and a predetermined bandwidth, it is desirable for the delay apparatus and method to provide a controlled amount of delay at the predetermined frequency, and which is uniform across the signal bandwidth. Accordingly, photonic signals at the predetermined frequency and having the predetermined bandwidth can be passed through the delay apparatus substantially unaltered, while imparting the predetermined delay to the signals.

Moreover, as electronic systems become more compact and lightweight it is important for the photonic delay to be implemented in a compact, lightweight apparatus which is compatible with other integrated optoelectronic systems. The apparatus should be easy to manufacture using conventional techniques and should be operable with signals of virtually any frequency.

SUMMARY OF THE INVENTION

It is therefore an object of the present invention to provide apparatus and methods for delaying photonic signals.

It is another object of the present invention to provide apparatus and methods which produce uniform delay of photonic signals over their bandwidth.

It is yet another object of the invention to provide apparatus and methods for delaying photonic signals having predetermined frequency and predetermined bandwidth without distorting the photonic signals.

These and other objects are provided, according to the present invention, by applying a photonic signal to a microresonator that includes a photonic bandgap delay apparatus having a photonic band edge transmission resonance at the frequency of the photonic signal to thereby impart a predetermined delay to the photonic signal. The photonic bandgap delay apparatus also preferably has a photonic hand edge transmission resonance bandwidth which is at least as wide as the bandwidth of the photonic signal such that a uniform delay is imparted over the entire bandwidth of the photonic signal. By directing the photonic signal to pass through the photonic bandgap delay apparatus one or more times, the microresonator of the present invention can controllably impart an adjustable delay to the photonic signal.

In addition to the photonic bandgap delay apparatus, the microresonator of the present invention includes a microresonator cavity in which the photonic bandgap delay apparatus is disposed. Preferably, the microresonator cavity is defined by a pair of spaced apart mirrors. According to one advantageous embodiment, each mirror is controllably switchable between a transmissive state in which photonic signals are permitted to enter and exit the microresonator cavity and a reflective state in which the photonic signals are internally reflected within the microresonator cavity. Thus, one of the mirrors can be initially switched to the transmissive state to permit photonic signals to enter the microresonator cavity. By thereafter switching the pair of mirrors to the reflective state, the photonic signals will reflect between the mirrors so as to make a plurality of passes through the microresonator cavity. During each pass through the microresonator cavity, the photonic bandgap delay apparatus will delay the photonic signals. Once the photonic signals have been appropriately delayed, one of the mirrors can be switched to the transmissive state to permit the photonic signals to exit the microresonator cavity. In order to prevent undesirable coupling or other feedback, the photonic bandgap delay apparatus is preferably spaced from each mirror by at least one half of the length of the pulse.

The microresonator of one advantageous embodiment also includes means, disposed within the microresonator cavity, for amplifying the photonic signals. Thus, energy that is lost as a result of the reflection from the mirrors or during transit through the photonic bandgap delay apparatus can be restored. In addition, the microresonator can include means, disposed within the microresonator cavity, for adjusting the phase of the photonic signals to thereby correct for the relatively small amounts of dispersion introduced by other elements of the microresonator. Since the photonic signals are oftentimes optical pulses, the microresonator can further include means, disposed within the microresonator cavity, for at least partially reshaping the optical pulses, typically including the pulse envelope and the variation of the phase and energy distribution with frequency of the spectral components that constitute the pulse. By at least partially reshaping optical pulses, the relatively short duration of the optical pulses can be maintained and small distortions in the shape of the optical pulses that are introduced by the other elements of the microresonator can be corrected. Accordingly, the microresonator of the present invention can controllably delay photonic signals without adversely effecting the amplitude, phase or shape of the photonic signals.

With respect to the photonic bandgap delay apparatus, the photonic bandgap delay apparatus of a first advantageous embodiment includes a predetermined plurality of first and second alternating layers which exhibit a series of photonic bandgaps in their transmission spectra. The first and second alternating layers have a predetermined thickness, and have predetermined indices of refraction. In particular, the first alternating layers have a relatively low index of refraction, $n_1$, and the second alternating layers have a relatively high index of refraction, $n_2$. The thicknesses of the layers also alternate such that the thickness a,b of the first and second layers, respectively, are $\lambda/(4n_1)$ and $\lambda/(4n_2)$ where $\lambda$ is the free space wavelength. Such a structure is also referred to as a distributed Bragg reflector. A range of wavelengths centered at $\lambda$ will be reflected. In other words, propagation of those wavelengths are not allowed inside the structure. Accordingly, a series of "photonic bandgaps" in the transmission spectra is obtained.

More generally, a second embodiment of a photonic bandgap delay apparatus includes a plurality of unit cells, each having variable index of refraction thereacross. Each unit cell is about $\lambda/2$ in thickness. For example, the unit cell may be a single layer having an arbitrary, variable index profile across the thickness thereof. Alternatively, the unit cell may be three layers having three different, constant indices of refraction. As in the first embodiment described above, a range of wavelengths centered about $\lambda$ will be reflected. Accordingly, a photonic bandgap is obtained near $\lambda$, with higher order gaps near $3\lambda$, $5\lambda$, etc.

Other embodiments of the photonic bandgap delay apparatus induce a periodically varying index of refraction in a material by application of an external electromagnetic field (such as optical energy) having spatial variation in different regions of the material. These structures may be referred to as "optically induced" photonic bandgap structures. The frequency of the external electromagnetic field will generally be close to, or the same as, the frequency of the photonic signal. In fact, in some cases, the photonic signal itself may induce a field in the material to vary the index of refraction and thereby create a photonic bandgap delay apparatus. These structures may be referred to as "self generating" photonic bandgap structures.

Outside the photonic bandgaps, the photonic bandgap delay apparatus exhibits a series of band edge transmission resonances. According to the invention, the thickness and/or number of layers in the photonic bandgap delay apparatus and/or their indices of refraction (constant or variable) are selected to produce a photonic band edge transmission resonance having a photonic band edge transmission resonance center frequency corresponding to the predetermined frequency of the photonic signal. In addition, the thickness and/or numbers of layers of the photonic bandgap delay apparatus and/or their indices of refraction are preferably selected to produce a corresponding photonic band edge transmission resonance bandwidth which is at least as wide as the predetermined bandwidth of the photonic signal such that photonic signals are uniformly delayed across their bandwidth.

It has been found, according to the invention, that when a photonic band edge transmission resonance is matched to the photonic signal which is being used, a controllable delay is imparted to the photonic signal without significantly altering the photonic signal itself. Matching of the photonic signal to the photonic band edge resonance is obtained by designing the photonic bandgap delay apparatus such that one of its transmission resonances has a transmission resonance center frequency corresponding to the frequency of the photonic signal and a photonic band edge transmission resonance bandwidth which is at least as wide as the bandwidth of the photonic signal.

As already described, the photonic bandgap delay apparatus exhibits a series of photonic band edge transmission resonances extending away from each photonic bandgap. Preferably, in the first embodiment, a band edge transmission resonance which is closest to either side of a photonic bandgap, and most preferably closest to the lowest order photonic bandgap, is used for matching to the photonic signal which is to be delayed. Accordingly, in the first embodiment, the number, thicknesses and/or indices of refraction of the layers are preferably selected to cause one of the closest photonic band edge transmission resonances to have a photonic band edge transmission resonance center frequency corresponding to the predetermined frequency and a photonic band edge transmission resonance bandwidth which is at least as wide as the predetermined bandwidth. In the first embodiment, when a closest transmission resonance frequency is matched to the photonic signal frequency and a closest transmission resonance bandwidth is at least as wide as the bandwidth of the photonic signal, a uniform predetermined delay can be imparted to the photonic signal without significant distortion of the signal. In the second embodiment, a band edge transmission resonance which is not closest to a bandgap may provide the best combination of a large, uniform delay.

A photonic bandgap delay apparatus may be designed according to the first embodiment of the invention to have a predetermined delay for photonic signals of predetermined frequency and predetermined bandwidth by having a predetermined plurality, N, of first and second alternating layers having an index of refraction parameter $T_{12}$ of $4n_1n_2/(n_1+n_2)^2$ and a thickness of each layer of $\pi c/(2\omega_0 n_1)$ and $\pi c/(2\omega_0 n_2)$ such that:

$$1/T_{12} = [1+\cos \pi/N \cos \pi/(2N)]/[1-\cos(\pi\Delta\omega/\omega_0)\cos(\pi<\omega>/\omega_0)]$$

and $$1/T_{12} = [\sin \pi/N \sin \pi/(2N)]/[\sin(\pi\Delta\omega/\omega_0)\sin(\pi<\omega>/\omega_0)],$$

where $<\omega>$ is the predetermined frequency of the photonic signal, $\Delta\omega$ is the predetermined bandwidth of the photonic signal, $\omega_0$ is the mid-gap frequency of the photonic bandgap structure, and c is the free space velocity of light. Since $T_{12}$, $\Delta\omega$ and $<\omega>$ are known, these two equations may be solved for the two unknown parameters of the photonic bandgap delay apparatus: $\omega_0$ the mid-gap frequency, and N the number of first and second layers. A numerical root-finding routine can be used to find appropriate values for $\omega_0$ and N, given $T_{12}$. For example, a photonic bandgap structure of gallium arsenide and aluminum arsenide (GaAs/AlAs) having 30 sets of alternating layers can produce a delay of 0.36 psec (108 $\mu$m) for a signal at 1.52 $\mu$m with a bandwidth of 2.3 nm (307 GHz).

A photonic bandgap delay apparatus may also be designed according to the second general embodiment of the invention to match the predetermined bandwidth $\Delta\omega$ and the predetermined frequency $<\omega>$ of the photonic signal to a photonic band edge resonance of the photonic bandgap structure including a predetermined plurality of unit cells, each having a predetermined thickness and a variable index of refraction n(x), across the predetermined thickness. An initial index profile n(x) functional form geometry is specified, and the group index $\rho_N=1/V_g$ for an N-unit cell photonic bandgap structure is determined. N is varied until the width of one of the photonic band edge resonances matches the required bandwidth $\Delta\omega$ of the photonic signal. The index profile n(x) of the unit cell is then rescaled. The group index is then calculated until the predetermined frequency $<\omega>$ of the band edge resonance under consideration matches the desired predetermined frequency of the photonic signal $<\omega>$. This procedure is repeated iteratively until both Δω and <ω> are obtained to within a desired degree of accuracy. Other photonic bandgap delay apparatus may be designed to have a photonic band edge transmission resonance which is matched to the photonic signal using other known techniques and techniques which may be developed in the future.

According to another aspect of the invention, the amount of delay can be varied by applying a predetermined voltage or set of voltages to the layers of the photonic bandgap delay apparatus to thereby further vary the index of refraction thereof. In this case, at least one of the layers should be fabricated of electrooptic material, the index of refraction of which changes in response to an applied voltage. Alternatively, the amount of delay can be varied by applying an external electromagnetic (optical) field to the structure to further vary the index of refraction inside the structure. In yet another alternative, the frequency of the applied signal may be varied to induce variation in the internal index of refraction.

A microresonator and an associated method for delaying photonic signals by a controllably adjustable delay with low distortion is thereby provided. In addition to the adjustable delay, the microresonator provides precise timing control for the photonic signals. The microresonator and associated method may therefore be used to fabricate a large class of optoelectronic devices such as devices for providing distributed timing signals and the like. Since the microresonator can produce and/or control ultrashort optical pulses at high repetition rates, the performance of the microresonator can resemble a modelocked laser oscillator, although the design of the microresonator including the photonic bandgap delay apparatus permits the microresonator to be much more compact than conventional modelocked laser oscillators. Due in large part to the precise timing control provided by the microresonator and the small size of the microresonator cavity occasioned by use of a photonic bandgap delay apparatus, a plurality of microresonators can be arranged in an array to simultaneously provide predetermined delays to a plurality of photonic signals so as to provide nonmechanical beam steering or the like.

BRIEF DESCRIPTION OF THE DRAWINGS

FIGS. 3A and 3B are schematic representations of first and second embodiments of an apparatus and method for delaying photonic signals according to the present invention.

DETAILED DESCRIPTION OF THE PREFERRED EMBODIMENTS

Figure 1A:
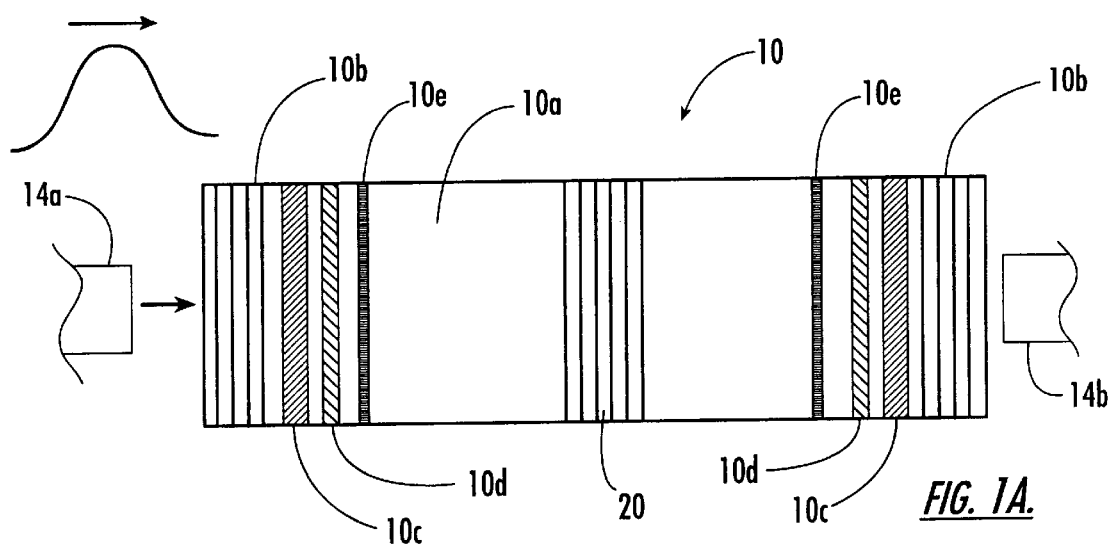
FIGS. 1A, 1B and 1C are schematic representations of a microresonator according to one advantageous embodiment of the present invention which illustrate the entry of a photonic signal into the microresonator, the oscillation of the photonic signal within the microresonator and the exit of the delayed photonic signal from the microresonator, respectively.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Referring now to FIG. 1A, a microresonator 10 according to one advantageous embodiment of the present invention is illustrated. The microresonator includes a microresonator cavity 10a and a photonic bandgap delay apparatus 20 disposed within the microresonator cavity. As will be described in detail below, the photonic bandgap delay apparatus has a photonic band edge resonance at the predetermined frequency of the photonic signals so as to delay the photonic signals during each pass through the microresonator cavity. In addition, the photonic bandgap delay apparatus preferably has a photonic band edge resonance bandwidth which is at least as wide as the predetermined bandwidth of the photonic signals such that the photonic bandgap delay apparatus provides a uniform delay over the entire bandwidth of the photonic signals. By directing the photonic signals to pass through the microresonator cavity several times, the microresonator can impart an adjustable delay since the photonic bandgap delay apparatus imparts the predetermined delay to the photonic signals during each pass of the photonic signals therethrough.

Accordingly, the microresonator 10 of the present invention can provide significant, albeit precisely controllable, delays to photonic signals. For example, although a microresonator can be designed to provide a wide range of adjustable delays, the microresonator of one advantageous embodiment is approximately 100 microns in length and provides up to 20 microns of delay for each pass of the photonic signals through the microresonator cavity 10a. Therefore, the microresonator can produce significant delays even though the microresonator cavity is quite small, particularly in a direction transverse to the optical axis in which the microresonator cavity has dimensions which approximate an optical wavelength.

Figure 1B:
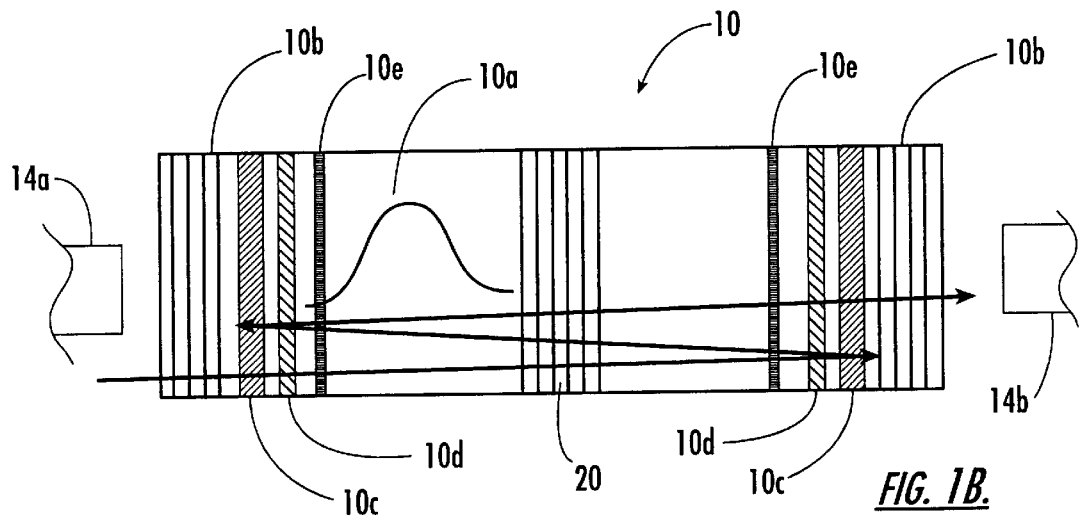
Figure 1C:
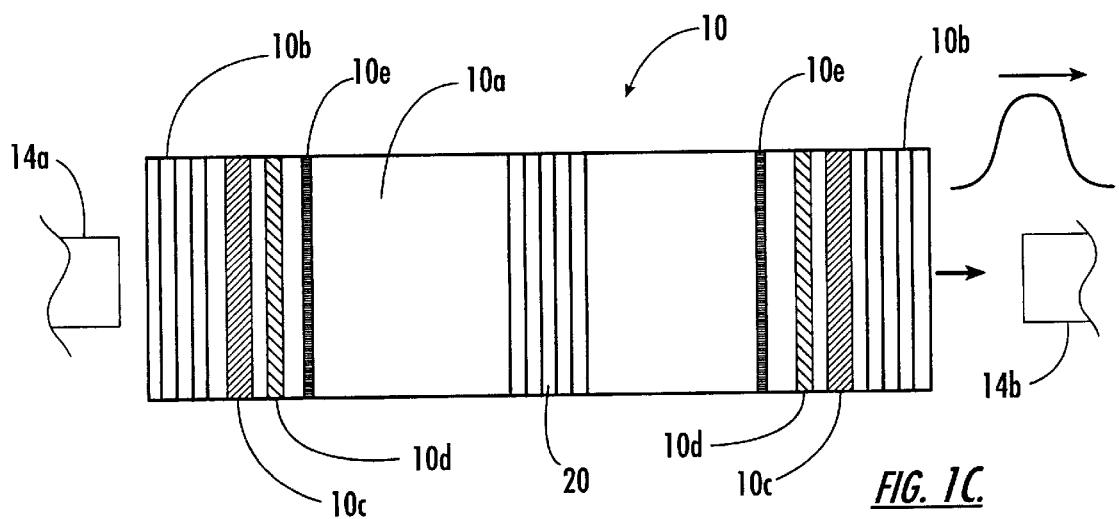

The photonic signals can enter the microresonator 10 from free space and exit the microresonator into free space. As shown in FIGS. 1A–1C, however, the microresonator can include means for directing the photonic signals into the microresonator cavity 10a. In this embodiment, a fiber optic cable 14a, lens or other conventional directing means may be used. Similarly, means for receiving the delayed photonic signals which emerge from the microresonator cavity can also be provided. The receiving means of this embodiment may be embodied by a fiber optic cable 14b, a lens or other conventional receiving means. Although not illustrated, the microresonator can also include a modulator or the like disposed within the microresonator cavity for internally generating the photonic signals subsequently emitted by the microresonator.

The microresonator cavity 10a is generally defined by a pair of mirrors 10b. The mirrors are spaced apart from one another as shown in FIG. 1A. In addition, the mirrors are preferably spaced from the photonic bandgap delay apparatus 20 by at least one-half of the pulse duration of the photonic signals to thereby avoid undesirable coupling and other disadvantageous feedback.

According to one advantageous embodiment, each mirror 10b is controllably switchable between a transmissive state and a reflective state. In the transmissive state, the mirror will permit photonic signals to enter the microresonator cavity 10a. In the reflective state, however, the mirror will reflect photonic signals, thereby effectively trapping the photonic signals within the microresonator cavity as described below. Accordingly, one of the mirrors can be initially switched to the transmissive state so as to permit photonic signals to enter the microresonator cavity as shown in FIG. 1A. Thereafter, the pair of mirrors can be switched to the reflective state such that the photonic signals reflect between the mirrors and make a plurality of passes through the microresonator cavity. See FIG. 1B. Once the photonic signals have been appropriately delayed within the microresonator cavity, one of the mirrors can be switched to a transmissive state to permit the delayed photonic signals to exit the microresonator cavity as shown in FIG. 1C. While the photonic signals of FIGS. 1B are illustratively shown to pass through the photonic bandgap delay apparatus 20 three times, the microresonator 10 can precisely control the number of passes which the photonic signals make through the photonic bandgap delay apparatus such that a very large delay can be controllably imparted to the photonic signals.

According to one advantageous embodiment, each switchable mirror 10b is comprised of a multi-layer stack of material which is arranged in such a way that layers of material having a relatively high index of refraction alternate with layers having a relatively low index of refraction. For example, a multi-layer stack of material can be comprised of alternating layers of GaAs and AlAs. By controlling the relative thicknesses of the alternating layers such that the difference in thickness between the layers having the relatively high index of refraction and the layers having the relatively low index of refraction is approximately one quarter of the wavelength of the photonic signals in free space, the mirror will be highly reflective. Each mirror of this embodiment also preferably include electrodes for applying a control voltage to the alternating layers which causes the mirror to become at least partially transmissive. While the switchable mirrors can be formed in a number of manners without departing from the spirit and scope of the present invention, one exemplary switchable mirror is described in an article entitled "Low-Voltage-Tunable Distributed Bragg Reflector Using InGaAs/GaAs Quantum Wells" by O. Blum that was published in Volume 5 of the IEEE Photonics Technology, pages 695–697 (1993).

Since the photonic signals will generally lose at least some energy as a result of being reflected by the mirrors 10b and passing through the photonic bandgap delay apparatus 20, the microresonator 10 of one advantageous embodiment also includes means 10c, disposed within the microresonator cavity 10a, for amplifying the photonic signals. While the means for amplifying the photonic signals can be embodied in a number of manners without departing from the spirit and scope of the present invention, the microresonator of one advantageous embodiment preferably includes a gain element or active region, such as a single or multi-quantum well structure for maintaining or further amplifying the photonic signals. See, for example, N. Duling, III, *Compact Sources of Ultrashort Pulses*, Cambridge University Press, New York, N.Y. (1995) which describes gain elements in conjunction with compact modelocked lasers. As shown in FIGS. 1A–1C, separate means for amplifying the photonic signals can be disposed within the microresonator cavity on each side of the photonic bandgap delay apparatus, if so desired.

As also shown in FIGS. 1A–1C, the microresonator 10 can include means 10d, also disposed within the microresonator cavity 10a, for adjusting the phase of the photonic signals. As such, the means for adjusting the phase of the photonic signals can correct for the dispersion that may be introduced by other elements of the microresonator. By adjusting the phase of the photonic signals, the phase adjusting means preferably adjusts both the phase of the optical wavefront of a pulse, i.e., the phase of the high frequency carrier underlying the pulse envelope, and corrects any undesired variation of the phase of the optical field with frequency of the spectral components that form the pulse. While the means for adjusting the phase of photonic signals can be embodied in many different manners without departing from the spirit and scope of the present invention, the microresonator of one advantageous embodiment can be designed in a similar fashion to the photonic bandgap delay apparatus 20 described hereinbelow so as to include a multi-layer stack of material which is arranged in such a way that layers of material having a relatively high index of refraction alternate with layers having a relatively low index of refraction. In contrast to the photonic bandgap delay apparatus, however, the difference in the respective indices of refraction of the alternating layers of the phase adjusting means can be made small or negligible. The phase adjusting means of this embodiment also preferably include electrodes for applying a control voltage to the alternating layers which alters the respective indices of refraction and creates the desired phase adjustments. In this regard, the phase adjusting means can be formed in much the same manner as the multi-layer structure described by the Blum article entitled "Low-Voltage-Tunable Distributed Bragg Reflector Using InGaAs/GaAs Quantum Wells". As also described by the Blum article, the phase adjusting means of this embodiment can include one or more quantum wells within the multi-layer structure. As described above in conjunction with the means for amplifying the photonic signals, separate means for adjusting the phase of the photonic signals can be disposed within the microresonator cavity on each side of the photonic bandgap delay apparatus, if so desired.

Since the photonic signals are oftentimes pulses having a predetermined shape, the microresonator 10 also preferably includes means, disposed within the microresonator cavity 10a, for at least partially reshaping the optical pulses. Thus, the means for at least partially reshaping the optical pulses can maintain the relatively short duration of the pulses and can correct for distortions of the pulse shape that may be introduced by other components of the microresonator, such as the photonic bandgap delay apparatus 20 or the mirrors 10b. While the means for at least partially reshaping the optical pulses can be embodied in many different manners without departing from the spirit and scope of the present invention, the microresonator of one advantageous embodiment includes an active modelocking element or the like for introducing a temporally modulated loss or gain so as to at least partially reshape the optical pulses. For example, the microresonator of one advantageous embodiment can be designed in a similar fashion to the photonic bandgap delay apparatus 20 described hereinbelow so as to include a multi-layer stack of material which is arranged in such a way that layers of material having a relatively high index of refraction alternate with layers having a relatively low index of refraction. In addition, other types of acceptable modelocking elements are described by N. Duling, III in *Compact Sources of Ultrashort Pulses* in conjunction with compact modelocked lasers. As described above in conjunction with the means for amplifying the photonic signals and the means for adjusting the phase of photonic signals, separate means for at least partially reshaping the pulses can be disposed within the microresonator cavity on each side of the photonic bandgap delay apparatus, if so desired.

Accordingly, the microresonator 10 not only provides a precisely controllable, adjustable delay to the photonic signals, but can also amplify the photonic signals, adjust the phase of the photonic signals and/or control the shape of the photonic signals. As such, the microresonator can impart the desired delay without adversely affecting the amplitude, phase and/or shape of the photonic signals. Since the microresonator can precisely control the delay, the amplitude, the phase and the shape of the photonic signals, a plurality of microresonators can be arranged in an array to provide precise delays to a plurality of photonic signals, such as required during agile, nonmechanical beam steering of the digitally encoded optical beams of an optical phase array.

In this regard, the microresonator 10 of the present invention is a microscopic structure having dimensions, particularly in the direction transverse to the optical axis, on the order of the optical wavelength that provides all of the control and pulse shaping elements required for an adjustable modelocked laser oscillator. Thus, an array of microresonators can be formed in which the microresonators are spaced on the order of the optical wavelength so as to provide an agile optical phased array that exercises precise control over the temporal and phase characteristics of the resulting array of optical pulses.

Figure 2A:
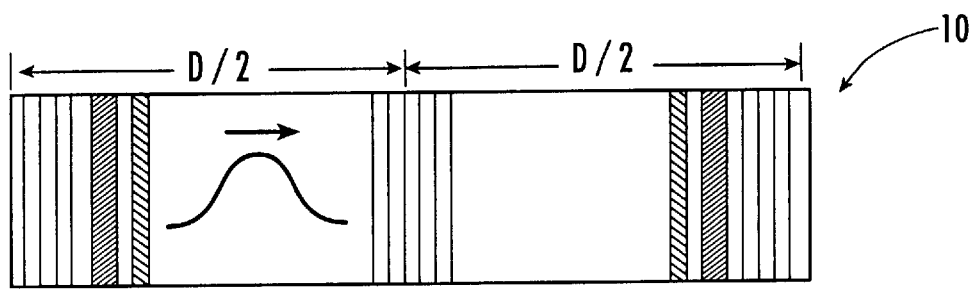
FIGS. 2A, 2B, 2C and 2D are schematic representations of a microresonator according to one embodiment of the present invention which splits a photonic signal into at least two photonic subsignals that follow different trajectories within the microresonator cavity and are thereafter recombined into a single, delayed photonic signal prior to exit from the microresonator.
Figure 2B:
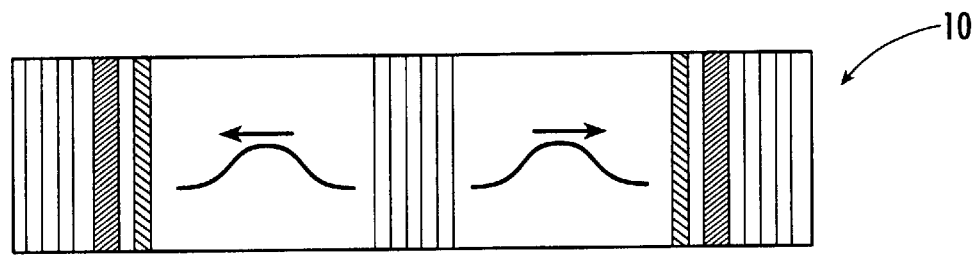
Figure 2C:
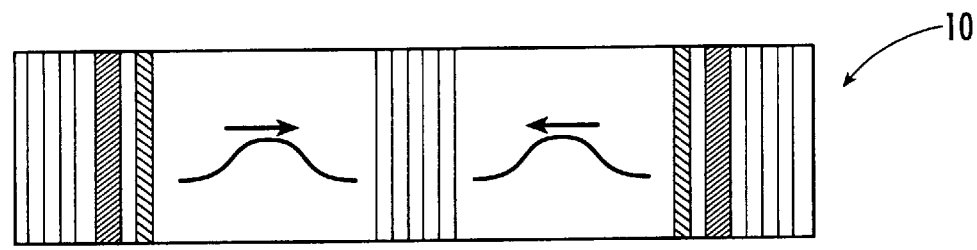
Figure 12:
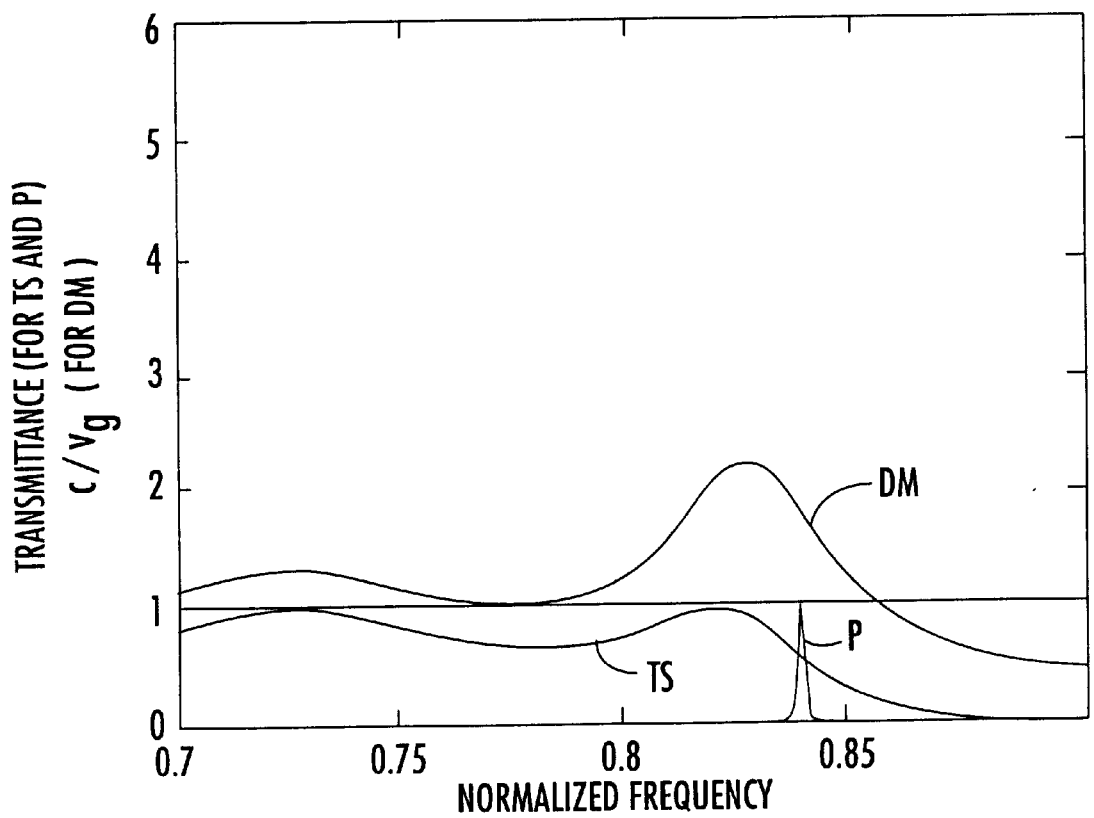
FIG. 12 graphically illustrates the transmission spectrum TS and the density of modes DM of an optical pulse and the bandwidth of the shifted optical pulse P.

While the microresonator 10 can require the photonic signals to pass any number of times through the microresonator cavity 10a in order to impart a desired delay, it has been determined that the operation of the microresonator and, more particularly, the sensitivity of the microresonator can be enhanced by splitting the photonic signals within the microresonator cavity as illustrated in FIGS. 2A–2D. As shown in FIGS. 2A and 2B, by centering the photonic bandgap delay apparatus 20 of the microresonator of this embodiment within the microresonator cavity and operating the photonic bandgap delay apparatus near the inflection point of the transmission spectrum and, hence, near the inflection point of the group velocity dispersion, the photo-nic bandgap delay apparatus effectively splits the photonic signal into a pair of photonic subsignals that are directed in opposite direction away from the photonic bandgap delay apparatus. As illustrated in FIG. 12, the transmission spectrum TS and the density of modes DM of an optical pulse and the bandwidth of a shifted optical pulse P are depicted. As shown, the units of the horizontal axis are frequency of the optical pulse normalized by the Bragg frequency, while the units of the horizontal axis are transmittance for the transmission spectrum and the speed of light divided by the group velocity ($c/v_g$) for the density of modes. As indicated by the units, the density of modes is basically the reciprocal of the group velocity. Therefore, a photonic bandgap delay apparatus 20 can be designed as described below such that the inflection point of the transmission spectrum is aligned with or very near the inflection point of the group velocity dispersion, thereby causing incident photonic signals to be split.

Figure 2D:
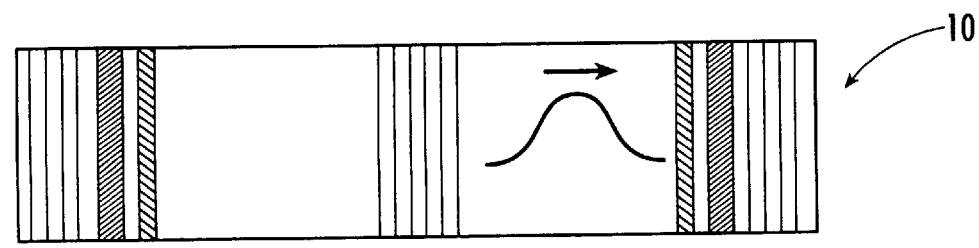

Following splitting, each photonic subsignal is then reflected through the microresonator cavity 10a a predetermined number of times. See FIGS. 2B and 2C. As described above, each photonic subsignal is delayed by a predetermined amount by the photonic bandgap delay apparatus 20 during each pass through the microresonator cavity. Once each photonic subsignal has been delayed by the desired amount, the photonic subsignals are combined by the photonic bandgap delay apparatus. By way of background, each photonic subsignal generally experiences a different phase shift while oscillating within the microresonator cavity. In order to recombine the photonic subsignals following the desired delay, the microresonator 10 and, more particularly, the phase adjusting means 10d preferably adjusts the respective phase of the photonic subsignals such that the phase difference between the photonic subsignals traveling in one direction away from the photonic bandgap delay apparatus is a odd multiple of $\pi$ while the phase difference between the photonic subsignals traveling in the opposite direction away from the photonic bandgap delay apparatus is a multiple of $2\pi$. As such, the photonic bandgap delay apparatus will combine the photonic subsignals in a coherent manner. The resulting photonic signal that is produced as a result of the combination of the photonic subsignals is then emitted by the microresonator as shown in FIG. 2D.

By having split the original photonic signal into photonic subsignals that separately oscillate within the microresonator cavity 10a and that are separately delayed by the photonic bandgap delay apparatus 20, the microresonator 10 and associated method of this advantageous embodiment produce a resulting photonic signal that has been delayed with less loss and higher sensitivity than in other embodiments of the microresonator that do not split the photonic signal into photonic subsignals as shown in FIGS. 2A–2D.

Referring to FIG. 12, a system designer can develop a programming strategy to minimize the undesirable distorting mechanisms, such as the group velocity dispersion at a given inflection point of the density mode curve DM (also known as the group index curve), and to, instead, access the large adjustable delay available on either side of the group index resonance by alternating the position of the group index resonance on each transit or pass, or on some subsets of transits or passes, through application of a timed pattern of control voltages to the various layers of the photonic bandgap delay apparatus 20 described below and/or to the various layers of the other elements of the microresonator, such as the amplification means 10c. As a result, the desired net group delay will accumulate while the undesired distorting group velocity dispersion caused by the two opposing slopes of the group index curves at the two inflection points largely cancel each other out. While the above-described technique is one strategy for minimizing the undesirable distorting mechanisms, other techniques can be utilized to enhance the desirable changes to the pulse position in time and the correspondingly minimize the undesirable pulse distorting mechanisms without departing from the spirit and scope of the present invention.

The photonic bandgap delay apparatus 20 is described and illustrated in U.S. patent application Ser. No. 08/584,403, the contents of which are incorporated in their entirely herein. As shown in FIGS. 3A and 3B, however, schematic representations of photonic bandgap delay apparatus and methods for delaying photonic signals are shown. Although the remainder of the microresonator 10 is not illustrated, the photonic bandgap delay apparatus of FIG. 3A and 3B is typically disposed within the microresonator cavity 10a as illustrated in FIGS. 1A and 1C and described above.

Referring to FIG. 3A, the photonic bandgap delay apparatus 20 receives photonic signals 13a of predetermined frequency $<\omega>$ and predetermined bandwidth $\Delta\omega$ and imparts a predetermined delay to the photonic signals 13a to thereby produce delayed photonic signals 13b. Preferably, photonic signals 13b replicate signals 13a in terms of pulse shape, but are delayed by a predetermined delay.

Still referring to FIG. 3, photonic bandgap delay apparatus 20 includes a first embodiment of a photonic bandgap structure having a predetermined plurality N of first and second alternating layers 11A . . . 11N and 12A . . . 12N, respectively. The first and second alternating layers have predetermined thicknesses a,b, respectively, and have predetermined indices of refraction $n_1$ and $n_2$ respectively.

As is well known to those having skill in the art, the photonic bandgap delay apparatus 20 includes a multi-layer stack of material which is arranged in such a way that alternating layers have a relatively high index of refraction $n_2$ and a relatively low index of refraction $n_1$, and the thickness of each layer also alternates such that $a=\lambda/(4n_1)$ and $b=\lambda/(4n_2)$, where $\lambda$ is the free space wavelength of the photonic signal 13a. The plurality of layers form a reflective dielectric coating. Such a structure is also referred to as a "distributed Bragg reflector".

A range of wavelengths centered at $\lambda$, $3\lambda$, $5\lambda$ . . . will be reflected; that is, propagation of those wavelengths will not take place inside the structure 20. Thus, the structure is referred to as a "photonic bandgap" structure, in analogy with electronic bandgaps of semiconductor theory. The bandgap regions of these structures has been widely investigated. See for example the publications entitled *A Beam Propagation Method That Handles Reflections* by co-inventors Scalora et al., *Optics Communications* (Vol. 108); pp. 191–196, (1994); and *Optical Limiting and Switching of Ultra-Short Pulses in Non-Linear Photonic Bandgap Materials* by co-inventor Scalora et al., *Physical Review Letters* (Vol. 73 No. 10); pp. 1368–1371, (1994).

Referring now to FIG. 3B, a second embodiment of photonic bandgap delay apparatus 20' has a predetermined plurality N of unit cells 18A - - - 18N, each having thickness d and having an index of refraction n(x) which varies across the thickness d of the unit cell. For example, optically induced photonic bandgap structures or self-generated photonic bandgap structures, as described above, may be used.

As is well known to those having skill in the art, when $d \approx \lambda/2$ and the variable index of refraction n(x) is the same for each unit cell 18A–18N, a photonic bandgap structure is formed. It will also be understood by those having skill in the art that the photonic bandgap delay apparatus 20 of FIG. 3A may be viewed as a special case of the photonic bandgap delay apparatus 20' of FIG. 3B, wherein the function n(x) is a step function of two different indices of refraction. However, the function n(x) may be any linear or nonlinear, continuous or discontinuous, function of the thickness d. Accordingly, unit cells 18A–18N may be viewed as a single layer with a varying index of refraction or a plurality of layers, each of which has a constant or varying index of refraction, as long as a periodic structure is produced by a plurality of unit cells 18A–18N. Other photonic bandgap structures now known or discovered hereafter may also be used in a microresonator and associated method according to the present invention. For example, optically induced photonic bandgap structures or self-generated photonic bandgap structures, as described above, may be used.

As is well known to those having skill in the art, semiconductor materials may be used to fabricate the photonic bandgap delay apparatus 20, 20'. In these applications, the semiconductor materials are being used for their optical properties, rather than for their electrical properties. However, because semiconductor materials may be formed with atomic layer precision using microelectronic manufacturing techniques, they are well suited for use in a photonic bandgap structure. Accordingly, the photonic bandgap delay apparatus may be formed by a heteroepitaxial structure of lattice matched semiconductor materials such as gallium arsenide and aluminum arsenide. Other techniques for forming photonic bandgap delay apparatus 20, 20' may also be used.

Finally, as also illustrated in FIGS. 3A and 3B, means for varying the index of refraction of at least one of the layers may be provided, to thereby vary the predetermined delay. Index of refraction varying means may be provided by voltage applying means 15 which applies a predetermined voltage to first layers 11A–11N, second layers 12A–12N or both, or to one or more of unit cells 18A–18N, to thereby vary the indices of refraction. In these applications, photonic bandgap delay apparatus 20, 20' is preferably fabricated, at least in part, of electrooptic materials, the index of refraction of which changes in response to an applied voltage. In another alternative, an external electromagnetic (for example, optical) field may be applied to the photonic bandgap delay apparatus 20, 20' to further vary the index of refraction and thereby vary the predetermined delay. In yet another alternative, the photonic signal itself may be used to further vary the index of refraction, and thereby vary the predetermined delay.

It will be understood by those having skill in the art that the present invention may be employed with any photonic radiation such as optical, x-ray, or microwave radiation. However, since optical signals are now being widely investigated for data processing, communications, and other applications, optical signals will now be described.

According to the invention, it has been discovered that an ultra-short optical pulse 13a which is incident at a transmission resonance, and for the first embodiment preferably a closest transmission resonance to the lowest order bandgap, of a photonic bandgap delay apparatus 20, 20', excites a novel photonic state. This state shows a marked photonic localization and a close approach to invariant transmission of the pulse. While not wishing to be bound by any theory of operation, it appears that this unusual combination of properties results from a coherent, resonant, momentum exchange between the ultra-short pulse 13a and the states of the photonic bandgap structure. A spatial separation of the optical electric and magnetic fields mediates this exchange, and results in transient energy storage in a quasi-standing wave in the photonic bandgap delay apparatus.

Although the bandgap characteristics of photonic bandgap structures have been widely investigated, it can also be shown that a photonic bandgap structure exhibits a series of N transmission resonances in each pass band of the one dimensional, N-period photonic bandgap structure. Each of these resonances exhibits peak transmittance near unity and a large group index. The more pronounced combinations of these properties occurs at the resonances close to the bandgaps, referred to as the band edge resonances. The most pronounced combination of these properties generally occurs at the band edge resonances which are closest to a bandgap.

Figure 4:
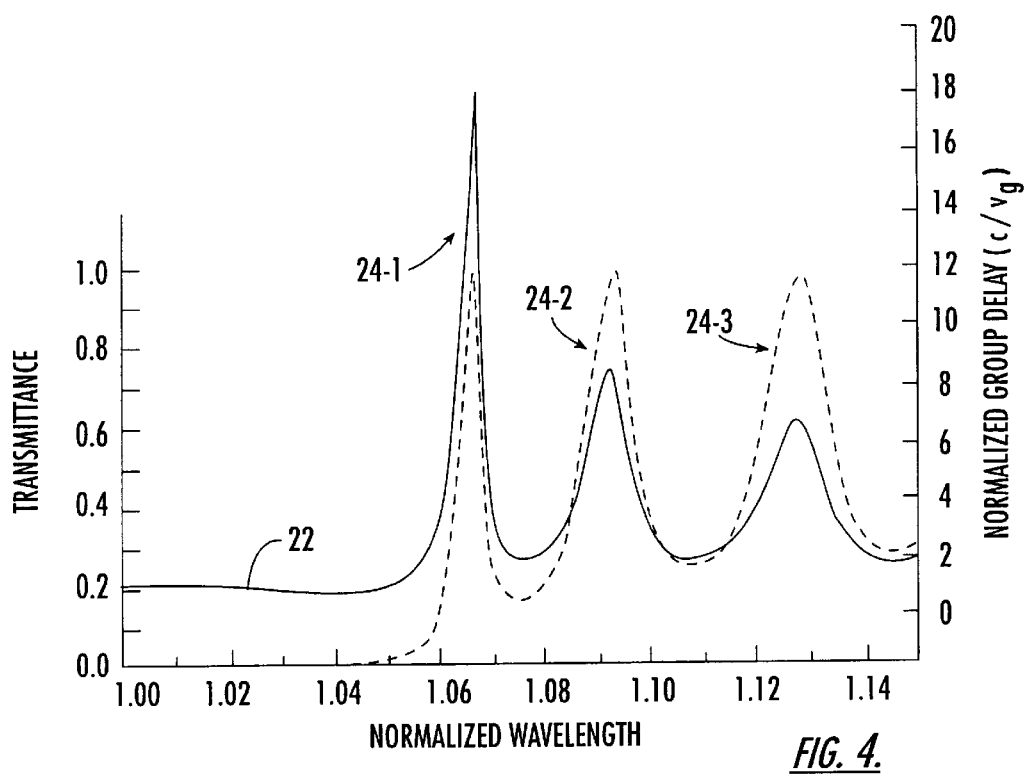
FIG. 4 graphically illustrates the theoretical transmittance and group delay of a photonic bandgap structure according to the present invention.

FIG. 4 graphically illustrates the theoretical transmittance T (dashed line) and group delay $n_g = c/v$ (solid line) of a photonic bandgap delay apparatus including 30 layers of gallium arsenide (GaAs) and aluminum arsenide (AlAs), plotted versus mid-gap normalized wavelength $\omega/\omega_0$, at the long wavelength edge of a photonic bandgap. In FIG. 4, the lowest order bandgap is indicated by 22 and three band edge transmission resonances are indicated by 24-1, 24-2 and 24-3. The closest band edge resonance is indicated by 24-1, since it is closest to the lowest order bandgap 22. It will be understood that in the first pass band there are a series of 30 resonances where transmittance T is near unity and group delay $n_g$ is also locally maximal. The absolute maximum in $n_g$ at the first band edge resonance 24-1 is shown. The group delay may be defined by $\delta = (n_g - 1)L$, where L is the total length of the photonic bandgap delay apparatus. It has been discovered according to the invention that the particular band edge detuning of the wavelength away from the mid-gap Bragg condition results in efficient transmission with minimal distortion while also increasing the group delay by an order of magnitude or more compared to free space.

Figure 5A:
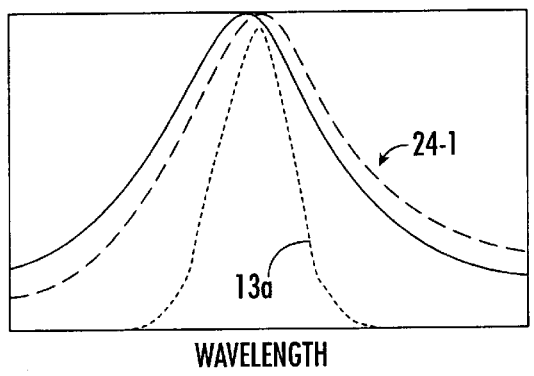
FIG. 5A illustrates an enlarged view of group delay at the long wavelength band edge resonance, and the bandwidth of a pulse that fits within the resonance, according to the present invention.
Figure 5B:
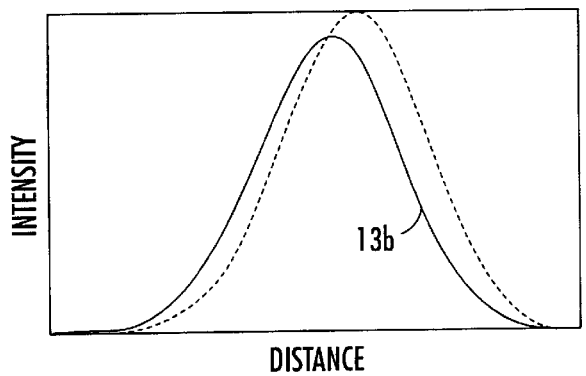
FIG. 5B illustrates an enlarged view of an incoming optical pulse and a delayed optical pulse according to the present invention.

FIG. 5A illustrates an enlarged view of the $n_g$ curve (solid line) at the long wavelength band edge resonance 24-1, with the dotted line representing the bandwidth of a two picosecond pulse 13a that fits well within the resonance (dashed line). FIG. 5B illustrates a simulated comparison of the peak-to-peak group delay of a 2 picosecond pulse 13b that propagates through the photonic bandgap delay apparatus 20 at the band edge (solid line) to a control pulse in bulk material (dotted line). As shown, the pulse 13b is transmitted through a simulated 7 $\mu$m thick photonic bandgap delay apparatus at a delay of nearly 110 $\mu$m, corresponding to a group index of $n_g = c/v_g$, of about 17. The preservation of pulse shape and amplitude is clearly shown.

Techniques for matching the location and bandwidth of a band edge resonance to the frequency and bandwidth of the photonic signal for a predetermined delay will now be described, for each of the embodiments of FIGS. 3A and 3B. Referring again to FIG. 3A, assume that the predetermined bandwidth of the photonic signal 13a is given by $\Delta\omega$ and the center frequency or carrier frequency of the photonic signal is given by $<\omega>$. A typical case would be a series of transform limited optical pulses having an approximately Gaussian shape, a bandwidth $\Delta\omega$, a duration $\tau_d \approx 0.44/\Delta\omega$ at some repetition rate $\omega_r$. A photonic bandgap delay apparatus 20 with a band edge transmission resonance that is located close to $<\omega>$ and has a bandwidth slightly in excess of $\Delta\omega$ is desired, according to the invention.

In general, the indices of refraction of the alternating layers $n_1$ and $n_2$, are constrained by the physical properties of the materials that can be microfabricated with the needed precision. Accordingly, $n_1$ and $n_2$, or at least some trial set of indices, may be specified. A solution for the values of the mid-gap frequency $\omega_0$ and the number of first and second layers N required to fabricate the correct photonic bandgap structure is desired.

The properties of a photonic bandgap delay apparatus are first calculated. For a photonic bandgap delay apparatus of FIG. 3A, each layer is generally designed so that the optical path is exactly ¼ of some reference wavelength $\lambda_0$ corresponding to the mid-gap frequency $\omega_0$. This parameter specifies the layer thicknesses a and b of the alternating layers according to the relation:

$$n_1 a = n_2 b = \lambda_0/4 = \pi c/(2\omega_0),$$

so that $$a = \pi c/(2\omega_0 n_1) \text{ and } b = \pi c/(2\omega_0 n_2).$$

For a quarter-wave stack, $\cos \beta = (\cos \pi(<\omega>/\omega_0) - R_{12})/T_{12}$. Also, the lower band edge maximum for $\rho_N$ is located between $\beta = ((2N-1)/N)(\pi/2)$ and $\beta = ((2N-3)/N)(\pi/2)$. Define the quantities:

$$\Delta\omega = (\omega_1 - \omega_2)/2$$

and $$<\omega> = (\omega_1 + \omega_2)/2$$

which are known spectral width $\Delta\omega$ and central frequency $<\omega>$ of the photonic signal. Here, $\omega_1$ and $\omega_2$ are the lower and upper limits respectively, of the spectral range of the photonic signal to be delayed. The following two equations relate the two edge frequencies in $\beta$-space to those in $\omega$-space:

$$\cos[\pi\omega_1/\omega_0] = R_{12} - T_{12} \cos 3\pi/(2N)$$

$$\cos[\pi\omega_2/\omega_0] = R_{12} - T_{12} \cos \pi/N$$

where $R_{12} \equiv (n_1 - n_2)^2/(n_1 + n_2)^2$ and $T_{12} = 4n_1 n_2/(n_1 + n_2)^2$. By adding and then subtracting these two equations, another pair of equations is obtained in $\Delta\omega$ and $<\omega>/\omega_0$:

$$1/T_{12} = [1 + \cos \pi/N \cos \pi/(2N)]/[1 - \cos(\pi\Delta\omega/\omega_0)\cos(\pi<\omega>/\omega_0)]1/$$
$$T_{12} = [\sin \pi/N \sin \pi/(2N)]/[\sin(\pi\Delta\omega/\omega_0)\sin(\pi<\omega>/\omega_0)].$$

Since $T_{12}$, $\Delta\omega$ and $<\omega>$ are assumed to be known, the last two equations specify two equations for the two unknowns $\omega_0$ and N, the mid-gap frequency and the predetermined number of first and second layers respectively. A numerical root-finding routine can be used to find appropriate values for $\omega_0$ and N, given $T_{12}$ (or $n_1$ and $n_2$).

As an example, suppose $n_1 = 2.9$, $n_2 = 3.2$, $\omega = 2.154 \times 10^{15}$ rad/s, and $\Delta\omega = 0.215 \times 10^{15}$ rad/s. This corresponds to a photonic bandgap delay apparatus fabricated from alternating layers of low index aluminum arsenide and high index aluminum gallium arsenide, a commonly microfabricated Bragg reflector used in semiconductor spontaneous emission experiments. Inserting these values into the last two equations and solving numerically yields N=9.23 and $<\omega> = 2.43 \times 10^{15}$ rad/s. Since N must be an integer, N=9 may be used and a correspondingly recalibrated $<\omega> = 2.45 \times 10^{15}$ rad/s may be used. By calculating the values of $\omega_1$ and $\omega_2$, the values $<\omega> = 2.164 \times 10^{15}$ rad/s and $\Delta\omega = 0.126 \times 10^{15}$ rad/s are obtained. The small difference in the final $\Delta\omega$ and $<\omega>$ from the initial values can be attributed to the fact that N had to be rounded to the nearest integer value when the root finding routine found an non-integer root. It will be understood by those having skill in the art that when using a root-finding routine, non-physical results such as negative values for n or a mid-gap frequency $\omega_0$ that is larger than the upper band edge of the structure should be rejected.

The theoretical model also predicts that the group index is very sensitive to local material index. The variation $\delta n_g/\delta n$ in group index, with respect to either of the two indices $n_1$ or $n_2$ making up the photonic bandgap structure, increases exponentially with the number of periods N in the structure. This increase impacts the bandwidth $\Delta\omega$ of the transmission resonance, which decreases exponentially with N, but not quite as rapidly as $\delta n_g/\delta n$ increases. For example, in a 30 period structure, $\delta n_g/\delta n$ is three orders of magnitude greater than that for an equivalent amount of bulk material, and the resonance bandwidth is 2.3 nm. For a 50 period structure, $\delta n_g/\delta n$ is four orders of magnitude larger than the bulk value, and the resonance bandwidth is 0.68 nm.

Figure 6:
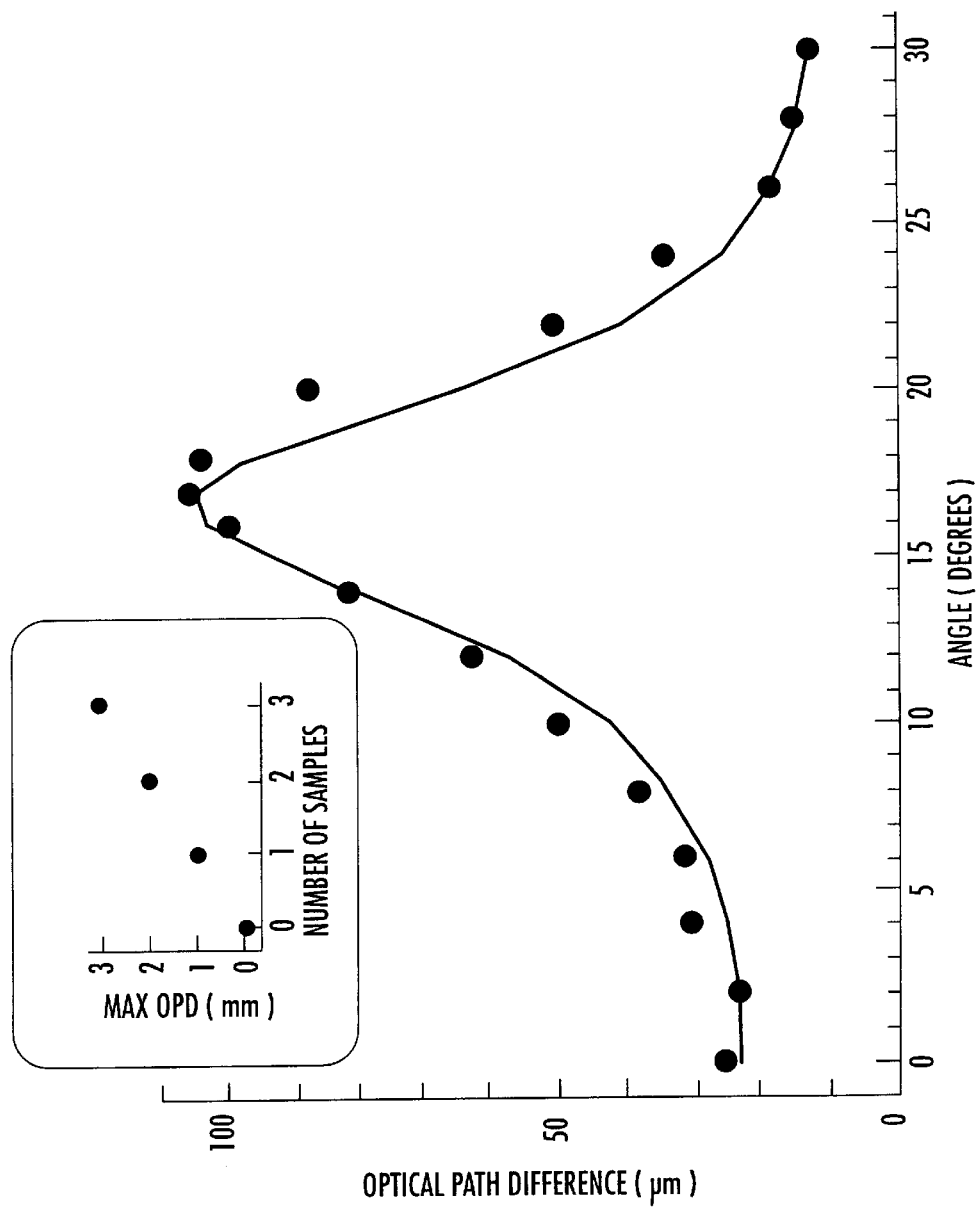
FIG. 6 graphically illustrates optical path difference versus angle of incidence of a pulse which is incident on a photonic bandgap structure according to the present invention.

Experimental verification of the predictions may be obtained by measuring the group delay as a function of the orientation of the photonic bandgap delay apparatus 20 normal relative to the direction of the incidence of the ultrashort optical pulse 13a. See FIG. 6. Varying the photonic bandgap structure orientation tunes the transmission resonance relative to the pulse spectrum. The resulting orientation-dependent delay may be calculated by a matrix transfer method and by pulse propagation simulations. The calculated delay agrees well with the experiment. The transmission T may also be measured as a function of photonic bandgap structure orientation. Similarly good agreement is found between experiment and theory. The maximum group delay clearly closely coincides with maximum transmission, as predicted. Comparison of the theoretical and experimental transmission plots may provide a precise measure of the photonic bandgap structure period. The period was found to be within 0.43% of the designed period. The simulations appear to confirm that atomic layer scale precision is important in obtaining the observed phenomena.

The experiment was performed by introducing the photonic bandgap delay apparatus 20 in one arm of an autocorrelator and then measuring the change in optical delay as a function of bandgap structure orientation. A harmonically mode-locked erbium fiber laser was used, with wavelength 1.529 $\mu$m, a repetition rate of 1.8 GHz, and nonlinear polarization-shaping to reduce the pulse duration to 2 ps. Each data point was obtained by averaging six autocorrelation traces. The one $\sigma$ deviation in precision was approximately 1 $\mu$m of optical path delay. The available angular stage limited the angular measurement precision for the bandgap structure to ±0.25 degrees.

The photonic bandgap delay apparatus included a 1.1166 $\mu$m spacer of AlAs as a stop etch and a GaAs substrate 355 $\mu$m thick. The structure was designed so that the long-wavelength band edge approximated the wavelength of the test laser (1528.5 nm). The delay due to the photonic bandgap structure was determined by etching the photonic bandgap structure substrate in one region of the sample, measuring the net optical delay for the substrate with photonic bandgap structure, and then measuring the delay for the substrate alone. The difference in optical delay is plotted in FIG. 6 as a function of orientation angle. The maximum delay for the photonic bandgap structure was 108 $\mu$m at a 17 degree angle of incidence. For the 8 $\mu$m thick layer (spacer plus photonic bandgap structure), this corresponds to a group index of $n_g$=13.5. The spacer and substrate cause a small reduction in group index compared to the case of the free-standing photonic bandgap structure (FIG. 2).

Note that the group index at 1.529 $\mu$m in bulk GaAs is $n_g$=3.55. The maximum transmittance, not including losses at the substrate interface, was about 95%. For comparison, the optical path change in bulk GaAs for the experimental angular change would be less than 1% or about 2 $\mu$m.

As already described, in practice it is often necessary to construct the photonic bandgap delay apparatus on a substrate and buffer layer. The presence of the substrate and buffer layer will generally modify the optical properties of the structure and thus should be considered in optimizing the design for the structure. This design can be accomplished by using the matrix transfer technique as outlined in Chapter 1 of *Computer-Aided Techniques for the Design of Multilayer Filters* by H. M. Liddell, Adam Hilger, Ltd; Bristol (1981). The equations given above may be used to calculate the desired properties of a photonic bandgap delay apparatus for a given signal center frequency $<\omega>$ and bandwidth $\Delta\omega$, and then the matrix transfer method may be used to determine how small changes in those parameters can be made to account for the presence of the substrate and buffer layers. Thus, by making small changes in the average layer thickness, the final parameters of the structure can be obtained that will have a transmission resonance precisely at $<\omega>$, and a transmission bandwidth $\Delta\omega$.

An example photonic bandgap delay apparatus might include a substrate such as gallium arsenide, a stop-etch or buffer layer of AlAs, and the photonic bandgap structure on the AlAs stop etch layer. The matrix transfer method assumes the signal light is incident normally on the photonic bandgap structure, so that the electric field E, at any point is dependent only on z; the direction normal to the interface planes. The electric field may be written (assuming $e^{i\omega t}$ time dependence) as $$E=Ae^{ikz}+Be^{-ikz}$$

where k=2, $\pi n/\lambda$ is the complex propagation wave number in the layer. Here, n is the total refractive index of the layer; n can be both complex and spatially variable. Once the electric field is known in one plane of constant z, it may then be calculated at an adjacent plane, separated in space by no more than one interface, by applying boundary continuity conditions. In matrix form this is accomplished by the following:

$$\begin{bmatrix} A_{m+1} \\ B_{m+1} \end{bmatrix} = 1/2 \begin{bmatrix} 1+Z & 1-Z \\ 1-Z & 1+Z \end{bmatrix} \begin{bmatrix} e^{-i\delta}m & 0 \\ 0 & e^{+i\delta}m \end{bmatrix} \begin{bmatrix} A_m \\ B_m \end{bmatrix}$$

Figure 8:
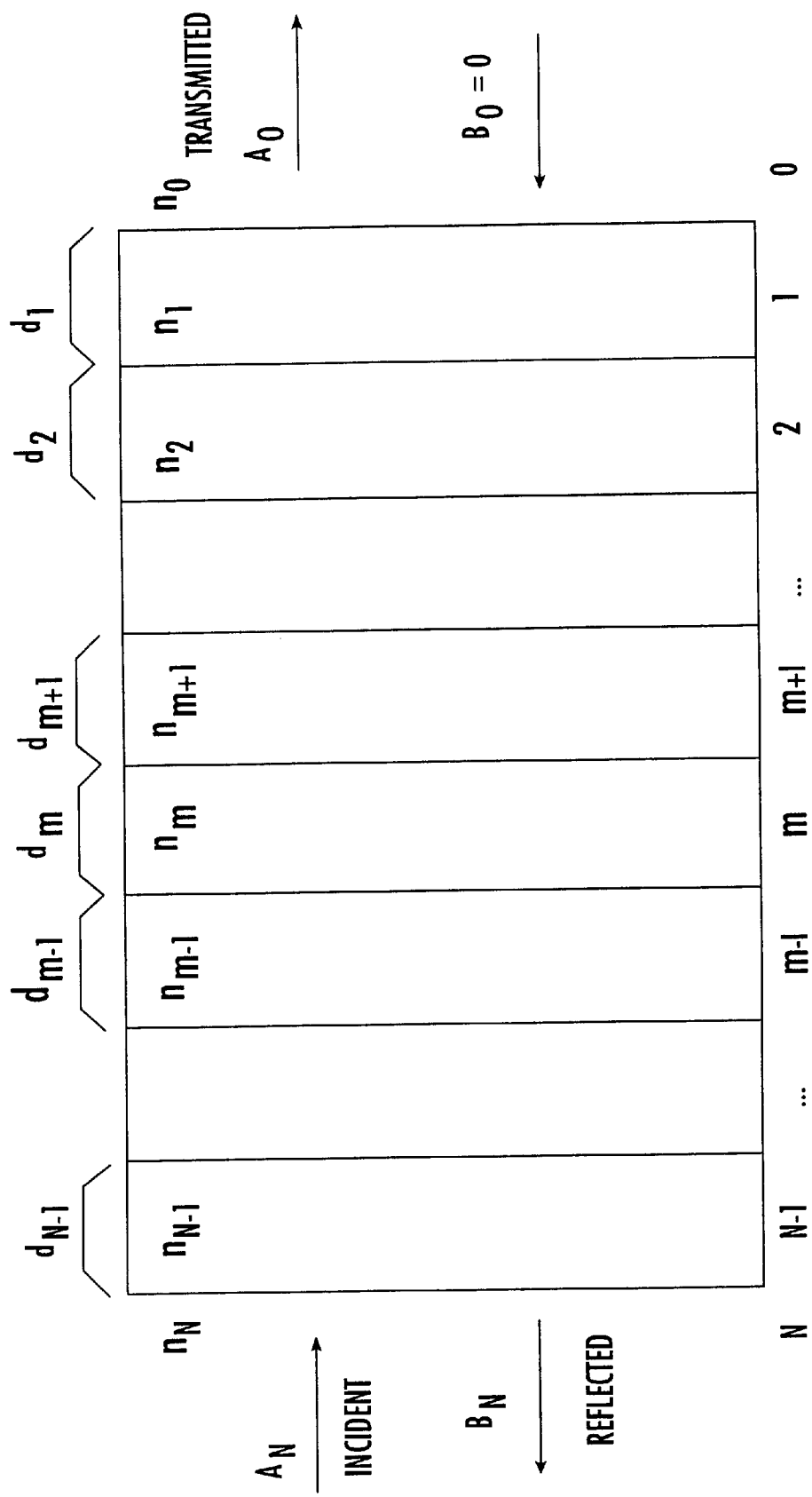
FIG. 8 is a schematic representation of a photonic bandgap structure according to the invention.

With this matrix equation, the total electric field amplitudes of all right-and left-traveling wave amplitudes at any plane inside the photonic bandgap structure may be found if both the right-and left-traveling wave amplitudes are known at any other plane. This is the case for the m=0 plane, where $A_0$ is set to some arbitrary number and $B_0$ is set to zero (since there are no left-traveling waves to the right of the structure). See FIG. 8.

Having found the transmitted field amplitudes for the structure including support and buffer layers, both the group delay and the transmission as a function of frequency may be calculated. In practice, some experimentation with the parameters such as layer thickness shows that the dependence of the transmission resonance on those parameters can be estimated and a final set of layer thicknesses found in a few iterations.

Note that surfaces separated by more than a pulse length in optical path from the photonic bandgap delay apparatus will not generally produce scattered components that significantly contribute to the transmitted pulse, and can generally be neglected from the computation. In essence the matrix transfer technique is a steady state approach that has been adapted to this particular application. If the above rule is observed and the above technique is used to compute the group delay, the calculated performance generally will closely approximate the performance observed in practice.

To summarize, the design may be accomplished by using the analytical expressions given above to determine the number of layers and the thicknesses of the layers given an assumed $n_1$ and $n_2$, and then adjustments for additional features such as a substrate and stop etch layer may be made by using the matrix transfer technique to find the transmitted signal for the modified structure. This latter step typically requires some trial and error, but the analytical expressions provide a sufficiently close approximation that these trial and error solutions usually converge quickly to a useful set of parameters.

Figure 9A:
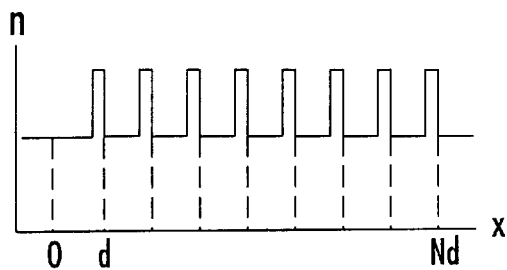
FIGS. 9A and 9B graphically illustrate example indices of refraction for the first embodiment of FIG. 3A.
Figure 9B:
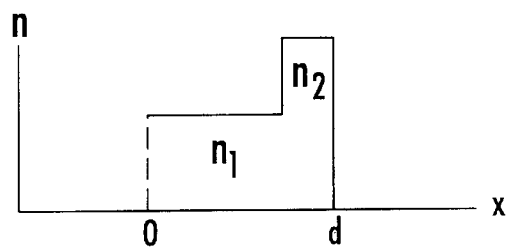

Techniques for matching the location and bandwidth of a band edge resonance to the frequency and bandwidth of the photonic signal for predetermined delay will now be described for the general embodiment of FIG. 3B. The embodiment of FIG. 3A may be regarded as a specific example of a general, finite, N-period, photonic bandgap structure. The specific example of FIG. 3A is an N-period, quarter-wave stack composed of N unit cells, with each unit cell including two layers of index $n_1$ and $n_2$ with the condition that the thickness a of the $n_1$ layer and b of the $n_2$ layer are related to an arbitrary reference wavelength $\lambda_0$ by the quarter-wave relation $a=\lambda_0/(4n_1)$ and $b=\lambda_0/(4n_2)$. FIGS. 9A and 9B graphically illustrate the indices of an entire photonic bandgap delay apparatus 20 and a unit cell, respectively.

Figure 10A:
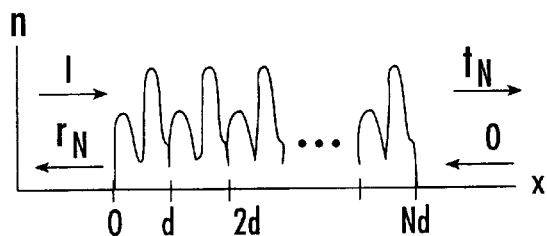
FIGS. 10A and 10B graphically illustrate example indices of refraction for the second embodiment of FIG. 3B.
Figure 10B:
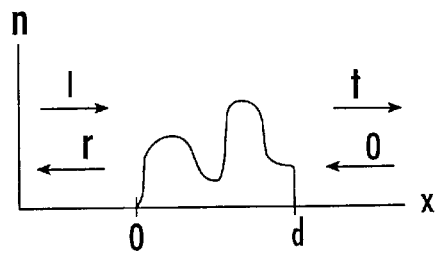

Although this particular example of a photonic bandgap structure is presently commonly used in photonics, it is not the only photonic bandgap structure. In fact, it is one subset of the general class of finite, one-dimensional, N-period, photonic bandgap structures which include an N-period layered stack composed of N unit cells, each of which has an arbitrary index profile, n(x), as illustrated in FIG. 3B. FIGS. 10A and 10B graphically illustrate the variable index of photonic bandgap delay apparatus 20' and a unit cell 18, respectively. The photonic bandgap delay apparatus of FIG. 1A has a specific index profile, $n(x)=n_1$ (if 0<x<a) and $n(x)=n_2$ (if a<x<b).

It has been found, according to the invention, that there are 2N transmission resonances of unit transmittance in each pass band of the transmission spectrum of any N-period photonic bandpass structure (except for the first pass band where there are only N transmission resonances), independent of the form n(x) that comprises the index profile of each period, provided that n(x) is variable across the thickness of the unit cell. Moreover, there are 2N group delay maxima in each pass band of the transmission group delay curve of the N-period photonic bandgap structure (except for the first pass band where there are only N delay maxima), independent of the form of the index profile n(x) of each unit cell. In general, these group delay maxima will be aligned with the transmission resonances. Finally, the transmission spectrum of an N-period photonic bandpass structure will display bandgaps or stop band regions where the transmission is exponentially small, provided the unit cell index profile n(x) is not constant. In addition, the group delay maxima located adjacent the stop band regions will display a global maximum in the overall group delay of the structure for that pass band, independent of the form of the unit layer cell index profile.

The fact that there are exactly 2N transmission resonances of unit transmittance in each higher order pass band of an arbitrary N-period photonic bandgap structure, follows from the following equation:

$$\frac{1}{T_N} = 1 + \frac{\sin^2 N\beta}{\sin^2 \beta}\left[\frac{1}{T} - 1\right]$$

where $T_N$ is the transmittance of the N-period photonic bandgap structure, and T is the transmittance of each unit cell of index profile n(x) that make up the structure. Here $\beta$ is the Bloch phase, defined by: $\text{Re}\{1/t\}=\cos\beta$, where t is the complex transmission of the unit cell. The fact that there are 2N transmission resonances apparently arises from the fact that $\sin^2(N\beta)$ is periodic with period 2N, which is true independent of the form of T, t or $\beta$, that depend specifically on the unit cell profile. Thus, there are 2N resonances that occur whenever $N\beta$ is a multiple of $\pi$, and hence $\sin^2(N\beta)=0$, showing that the transmittance $T_N$ is unity.

The mode density (or reciprocal of the group velocity) is $$\rho_N = \frac{1}{D}\frac{\frac{1}{2}\frac{\sin^2 N\beta}{\sin\beta}\left(\eta' + \frac{\eta\xi\xi'}{1-\xi^2}\right) - \frac{N\eta\xi'}{1-\xi^2}}{\cos^2 N\beta = \left(\eta^2\left(\frac{\sin N\beta}{\sin\beta}\right)\right)^2}.$$

Figure 11A:
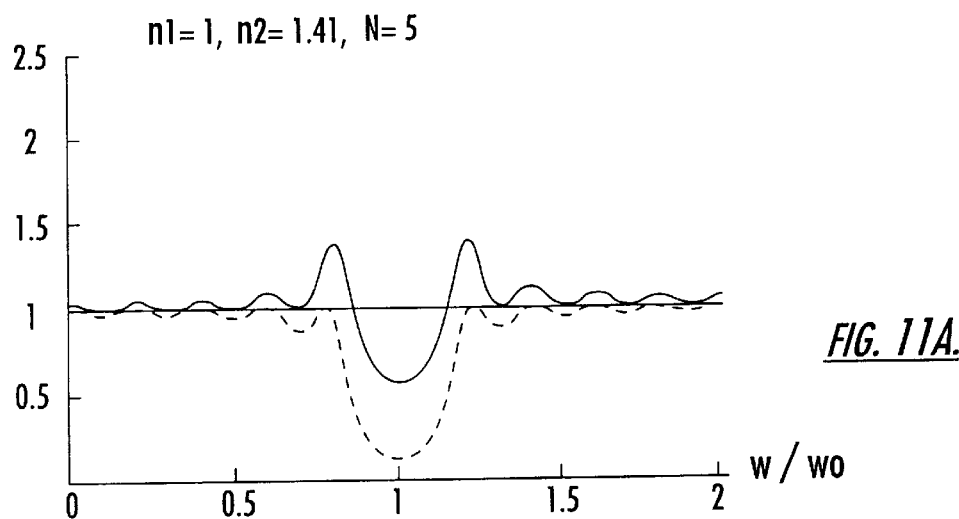
FIGS. 11A and 11B graphically illustrate density of modes for photonic bandgap structures.
Figure 11B:
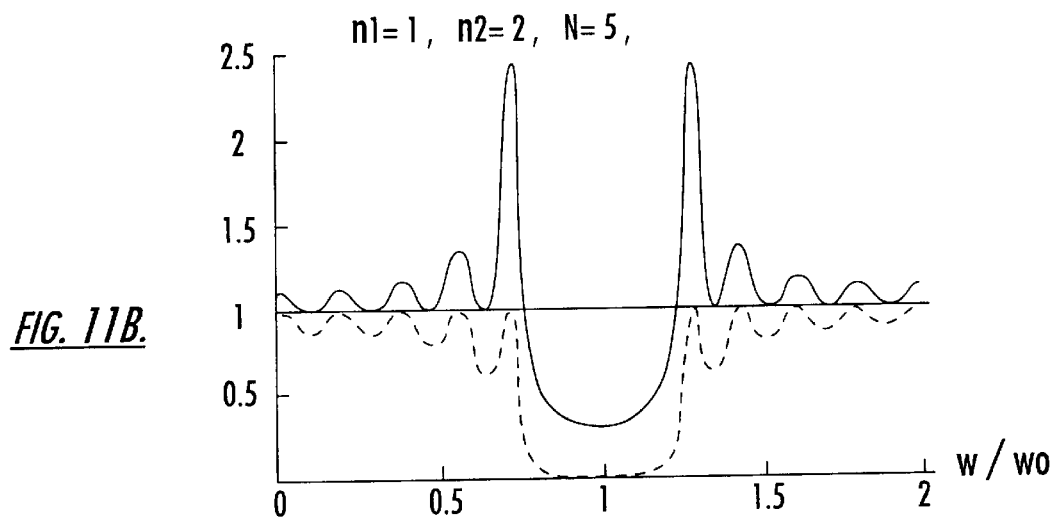

Here D=Nd, $\xi$ denotes x/T (i.e., cos $\beta$), $\eta$=y/T where t=x+iy is the complex transmission coefficient for the unit cell, and $\xi'$ and $\eta'$ are derivatives of these quantities with respect to $\omega$. A plot of the density of modes $\rho_N$ ($\rho_N$ is the reciprocal of the group velocity and hence gives a direct measure of the delay produced by the structure) and the transmittance $T_N$ is given in FIGS. 11A and 11B for a five period (N=5), photonic bandgap structure with $n_1=1$, $n_2=1.41$ in FIG. 11A; and $n_{1=1}$ and $n_2=2$ in FIG. 11B. Note the five transmission resonances on either side of the bandgap in both plots corresponding to N=5. As the value of $n_2$ increases from 1.41 in FIG. 11A to 2 in FIG. 11B, the gap becomes more defined and the density of modes resonances become greater in magnitude. The maxima and minima of the density of modes and transmission appear to line up; however, there is a small amount of offset between the extreme values of the two curves that becomes rapidly negligible for increasing number of periods N. The density of modes is normalized to the bulk group velocity divided by the speed of light so that the density of modes plotted in FIGS. 11A and 11B is actually equal to $c\rho_N/v^{bulk}$.

Also, note that the equation for the transmission shows that whenever $N\beta=m\pi$, m$\in \{0, 1, \ldots, N-1\}$, then the sin $2N\beta$ term is equal to zero and $T_N=1$ exactly. This phenomenon corresponds to the N transmission resonances seen in FIGS. 11A and 11B. Unexpectedly, in general, these transmission resonances of $T_N$ are unity, independent of the unit cell's transmission T. In other words, even if $T(\omega)$ is practically zero at these points, and hence the unit cell is highly reflective, nevertheless the entire N-period structure is transparent. These "sweet spots" are properties of the finite periodicity of the structure alone, not of the unit cell. These resonances are known in the theory of finite quarter-wave structures-but the fact they are a general property of any N-period one-dimensional dielectric structure has not been fully appreciated. See, e.g., D. W. L. Sprung et al. Am. J. Phys. 61, 1118 (1993). In addition, E. Brown has recently observed similar resonances in transmission experiments with finite three-dimensional photonic bandgap crystals indicating that the phenomenon may generalize to higher dimensional lattices. When $N\beta$ is equal to odd multiples of $\pi/2$, then the transmission curve $T_N$ will be close to, but not exactly at, a local minima. The approximation improves very rapidly with increasing N. This is apparently due to the fact that sin $2N\beta$ is a maximum at this point, and since it is the most rapidly varying term, the entire function will be close to its minimum, since sin $2N\beta\sim1/T$ is largest there.

As regards the density of modes $\rho_N$, the fact that the peaks of $T_N$ and $\rho_N$ very nearly line up may be used to determine the conditions that produce the maximum delay. This approximation improves rapidly with increasing N so that the density of modes (or group index) will have its maxima at approximately $\beta=m\pi/N$, $m\xi$ {0, 1 . . . N–1}. This apparently can be understood by inspecting the equation for $\rho_N$. When $N=m\pi$, then sin $N\beta=0$, sin $2N\beta=0$, and $\cos^2 2N\beta=1$. Hence, the most rapidly varying term in the denominator of $\rho_N$ is nearly as small as possible, while the numerator remains proportional to large N– tending to maximize $\rho_N$. Evaluating the density of modes at these approximate maxima gives the general equation:

$$\rho_N^{\max}\bigg|_{\beta=\frac{m\pi}{N}} \cong -\frac{1}{D}\frac{N\eta\xi'}{1-\xi^2}\bigg|_{\beta=\frac{m\pi}{N}}$$

This provides a direct way to calculate the group delay at the band edge resonance without plotting the entire curve.

Thus, there are 2N maxima in the group delay that line up with these transmission resonances. It can also be shown that the group delay will be globally maximal in each pass band at the resonances closest to a photonic bandgap.

For the specific case of a quarter-wave photonic bandgap structure (FIG. 1A), the equations needed for matching the bandwidth $\Delta\omega$ and the carrier frequency $<\omega>$ of the photonic band edge resonance signal to those of the photonic bandgap structure can be written down and solved explicitly, as described above. In the general case when the unit layer cell has an arbitrary index profile n(x), no specific formula appears to be applicable. Rather, a series of steps may be used to find the parameters of the structure needed to construct the device:

1. Specify an initial index profile n(x) functional form geometry for a unit cell layer of thickness d. For example, for the quarter-wave structure of FIG. 1A, $n(x)=n_1$ (if $0<x<a$) and $n(x)=n_2$ (if $a<x<b$), where $a+b=d$. Another example might be a humpbacked profile: $n(x)=\sin^2(\pi x/d)$, (if $0<x<d$).

2. Determine the group index $\rho_n=1/v_g$ for an N unit cell structure, for some initial value of the required number of unit cells N. Vary the integer N until the width of one of the band edge resonances in group index matches the required bandwidth, $\Delta\omega$, of the photonic signal to be delayed.

3. Now that the bandwidth matches, fix N, and rescale the index profile of the unit cell by making the resealing transform $n(x)\rightarrow\alpha n(\beta x)$, where $\alpha$ and $\beta$ are allowed to vary continuously. For example, if the initial profile was $n(x)=\sin^2(\pi x/d)$, then the rescaled profile to be varied is $\alpha n(\beta x)=\alpha \sin^2(\beta\pi x/d)$. Vary $\alpha$ and $\beta$ and continue to determine the group index for each variation, until the central location $<\omega>$ of the band edge resonance under consideration matches the desired carrier frequency of the photonic signal, to within the desired degree of accuracy. Since D=Nd, and d is fixed, varying N will vary the thickness D.

4. If the process of matching the predetermined frequency in step 3 has disturbed slightly the desired match of bandwidth found in step 2, then repeat steps 2 and 3 iteratively, until convergence to the desired degree of accuracy in both bandwidth $\Delta\omega$, and carrier frequency $<\omega>$ has been achieved.

Given an initial value for the functional form n(x) of the unit layer cell index profile, and given the desired bandwidth $\Delta\omega$, and carrier frequency $<\omega>$ of the photonic signal to be delayed, the above steps will yield as an output the values for the parameters N, $\alpha$ and $\beta$ which are needed to build the photonic bandgap structure, given a fixed thickness per unit cell d. In other words, an N-layered photonic bandgap structure, each of whose layers are identical, and have an index profile given by the function $f(x)=\alpha n(\beta x)$, is specified.

Note that the original functional form of the index profile n(x) and its thickness d are specified in advance. This function may be constrained by the ability to fabricate layers with arbitrarily varying index profiles. Easiest to make are bi-layer profiles: $n(x)=n_1$ or $n_2$, as in FIG. 3A. However, one may fabricate tri-layer profiles, $n(x)=n_1$, $n_2$, $n_3$, quad layer profiles, etc. In general, these step-like profiles may be easiest to fabricate. However, with improvements in microfabrication, sawtooth profiles such as $n(x)=mx+b$, humpback profiles such as $n(x)=\sin^2(\pi x/d)$, etc., may be fabricated in the future. Externally applied electromagnetic fields, with appropriate spatial variations, may also be used to create spatial variations of the index of refraction within the photonic bandgap structure, in profiles which may be difficult to attain using conventional microfabrication techniques. All of these profiles may produce a photonic bandgap delay apparatus and method, since the properties of the photonic bandgap delay apparatus and method are independent of the form of the unit cell index profile.

Additional tunable group delay may be obtained, also with nearly invariant transmission of pulse form and energy, by adding photonic bandgap structures in a linear array. In this experiment, the photonic bandgap structures were left on their substrates. It was found that the group delay accumulates linearly with the number of bandgap structures with no measurable distortion of pulse shape. See the inset in FIG. 6. The substrates, however, prevented exploration of an arrangement of more than two bandgap structures closer together than the substrate thickness.

Sequences of more closely spaced, photonic bandgap structures were also explored using simulations. The simulations appeared to indicate that, as one places additional photonic bandgap structures closer than half a pulse width, feedback begins to perturb the structure of the band-edge transmission resonances. This appears to alter the group index shown in FIG. 4, and the array of individual bandgap structures appears to act as a single, extended, photonic bandgap structure.

Accordingly, some additional considerations are generally warranted to optimally design a microresonator 10 that includes iterated sequences of photonic bandgap delay apparatuses 20. For example, it is possible to obtain twice the group delay with negligible reduction of bandwidth by placing a second photonic bandgap structure within the microresonator cavity at approximately an optical wavelength after the first, and making small variations in the layer thicknesses to obtain maximum group delay with minimum loss of bandwidth. Alternatively, successive photonic bandgap structures may be used to accumulate additional group delay with no loss of bandwidth if successive structures are spaced within the microresonator cavity by at least an optical pulse width apart. In yet another alternative, photonic bandgap structures can be placed closer than a pulse length in space apart within the microresonator cavity, and the optimum structure discerned using the matrix transfer technique can be used in a trial and error type of approach to find the maximum group delay with minimum constraint on bandwidth. In yet another alterative, the microresonator cavity can include optical isolating material that is placed between the photonic bandgap structures in order to make the entire device as compact as possible.

Figure 7A:
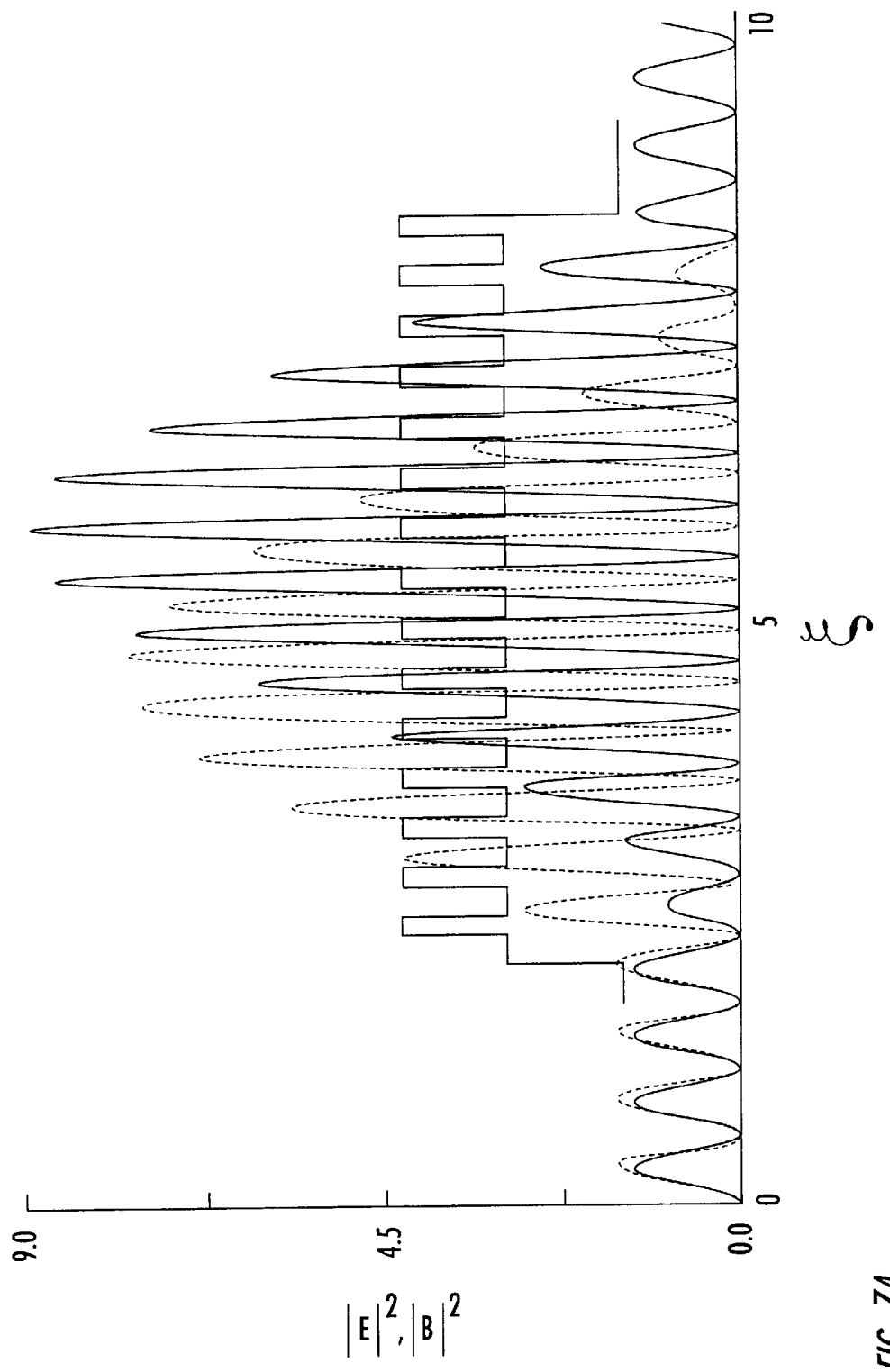
FIGS. 7A and 7B graphically illustrate instantaneous electric and magnetic field profiles and the spatial distribution of electromagnetic momentum respectively, for a delay apparatus and method according to the present invention.
Figure 7B:
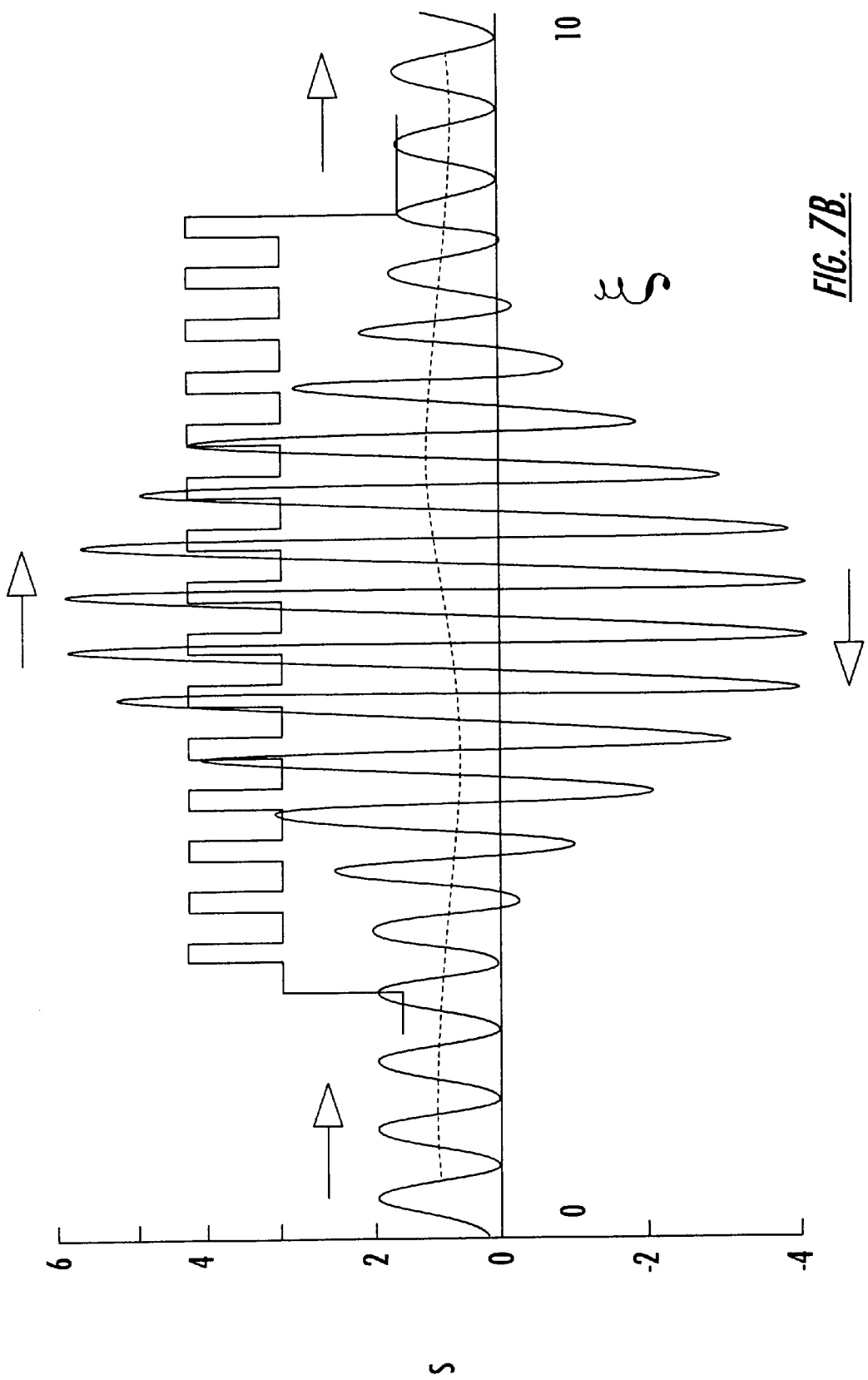

The results of these simulations may be used to gain insight into the apparent physical origin of this novel excited state. FIG. 7A graphically illustrates the instantaneous electric field $E^2$ (solid line) and magnetic field $B^2$ (dotted line) profiles of a simulated, ultrashort pulse, tuned to a closest band-edge resonance of a photonic bandgap delay apparatus. The index profile is also plotted (not to scale). FIG. 5A illustrates the intensity at the entrance to, within, and at the exit from the photonic crystal for an instant when the pulse is approximately halfway through the bandgap structure. FIG. 7B graphically illustrates the spatial distribution of electromagnetic momentum (Poynting vector-solid line) corresponding to the same case depicted in FIG. 7A. Both plots are for the same instant in the transmission process.

Points above the axis correspond to momentum propagating to the right and points below the axis correspond to momentum propagating to the left (as indicated by the arrows). The mean local momentum averaged over a unit cell is also shown as a dotted line. The mean local momentum is always positive, corresponding to net forward propagating momentum. The local momentum, averaged over a unit cell, is useful in visualizing the relationship between the local value of the net forward-directed momentum and the stored momentum in the quasi-standing wave generated in the photonic bandgap structure. The Poynting vector, $S=ExB$, is given in normalized units of $c/4\pi$. The strong localization of the electromagnetic energy within the crystal is coincident with a marked spatial separation of the electric and magnetic fields. This case also shows a marked displacement of the electric and magnetic field envelopes. Momentum (energy) appears to scatter from the forward propagating fields into the quasi standing wave in the first half of the photonic bandgap structure and then appears to scatter back from the quasi-standing wave into the forward propagating fields in the second half of the crystal.

FIGS. 7A and 7B may be interpreted as a combination of the forward-propagating electromagnetic field of the ultrashort pulse and quasi-standing wave that transiently forms in the photonic bandgap structure. In this model, the first half of the photonic bandgap structure scatters energy from the forward-propagating fields into the quasi-standing wave, while the second half of the photonic bandgap structure scatters energy from the quasi-standing wave back into the forward-propagating fields. Inside the photonic bandgap structure, the wave appears to oscillate within the central region, carrying and transiently storing substantial electromagnetic energy in a circulatory manner. The case depicted in FIGS. 7A and 7B is near the peak of the pulse. As might be expected, the transfer from the forward-propagating wave to the quasi-standing wave is larger than the inverse process when the leading edge of the pulse is entering the photonic bandgap structure. The reverse appears to be true for the trailing edge of the pulse.

It appears that this highly dynamic state plays a key role in producing the observed phenomena of high transmission and large group index. In particular, the additional anomalous momentum and energy flow appears central to the understanding of the momentum exchange mechanism. This additional anomalous energy and momentum flow appears to give the delay apparatus and method many of its unique properties.

These simulation techniques also describe quantitatively the transfer of substantial net momentum from the pulse to the photonic bandgap structure, as well as the inverse process. Essentially, the only change appears to be a strong group delay for the ultrashort pulse. A roughly 20–40% transfer and reacquisition of momentum is shown for parameters typical of the experimental case. In visualizing this process, it may be useful to bear in mind that this momentum transfer occurs sequentially along the length of the pulse. Apparently, this is because only a fraction of the pulse is in the photonic bandgap structure at any one instant, because the photonic bandgap structure length is short compared to the pulse length in space. The simulations also apparently show that the strong spatial localization of the optical field in the crystal accompanies a complementary strong delocalization of the optical field in momentum space, as suggested by FIG. 5B.

Accordingly, the group delay for an optical pulse can exhibit a dramatic increase when the pulse is spectrally matched to a band edge transmission resonance (in some embodiments a closest band edge transmission resonance) of a photonic bandgap delay apparatus. Strong transient localization of the optical energy in the photonic bandgap delay apparatus provides a large and sensitively adjustable group delay. This occurs in combination with a close approach to invariant transmission of pulse form, energy, and momentum. The properties appear to follow from application of Maxwell's equations to the combined system of photonic bandgap structure and ultrashort optical pulses. Furthermore, the group-delay phenomenon appears to accumulate linearly in sequences of these photonic bandgap structures. Accordingly, arrays of relatively closely spaced photonic bandgap structures appear capable of providing very large adjustable group delays.

Therefore, a microresonator 10 including a photonic bandgap delay apparatus 20, 20' as described above can controllably impart relatively long delays to photonic signals. By controlling the number of passes which the photonic signals make through the microresonator cavity 10a, the microresonator can provide an adjustable delay that can be tailored by the system designer as required by the particular application. In addition, the microresonator can controllably adjust the amplitude, the phase and the pulse shape of the photonic signals such that the delay imparted by the photonic bandgap delay apparatus does not alter these other characteristics of the photonic signals. Thus, the microresonator of the present invention can be employed in conjunction with a plurality of other microresonators in order to controllably provide delay to a plurality of photonic signals, such as for non-mechanical beam steering applications and the like. In this regard, an array of microresonators can be formed in which the microresonators are spaced on the order of the optical wavelength so as to provide an agile optical phased array that exercises precise control over the temporal and phase characteristics of the resulting array of optical pulses.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A microresonator for delaying photonic signals of a predetermined frequency, the microresonator comprising:
   a pair of switchable mirrors that are spaced apart to define a microresonator cavity therebetween, wherein each mirror is controllably switchable between a transmissive state in which photonic signals enter and exit the microresonator cavity and a reflective state in which photonic signals are internally reflected within the microresonator cavity; and a photonic bandgap delay apparatus having a photonic band edge resonance at the predetermined frequency of the photonic signals, wherein said photonic bandgap delay apparatus is disposed within the microresonator cavity defined by said pair of mirrors for delaying the photonic signals during each pass of the photonic signals through the microresonator cavity to thereby impart an adjustable delay to the photonic signals.

2. A microresonator according to claim 1 further comprising means, disposed within the microresonator cavity, for amplifying the photonic signals.

3. A microresonator according to claim 1 further comprising means, disposed within the microresonator cavity, for adjusting the phase of the photonic signals.

4. A microresonator according to claim 1 wherein the photonic signals are optical pulses having a predetermined shape, and wherein the microresonator further comprises means, disposed within the microresonator cavity, for at least partially reshaping the optical pulses.

5. A microresonator according to claim 1 wherein the photonic signals are optical pulses having a predetermined pulse length, and wherein said photonic bandgap delay apparatus is spaced by at least one-half of the predetermined pulse length of the optical pulses from each of said pair of mirrors.

6. A microresonator according to claim 1 wherein the photonic signals have a predetermined bandwidth, and wherein said photonic bandgap delay apparatus has a corresponding photonic band edge resonance bandwidth which is at least as wide as the predetermined bandwidth of the photonic signals.

7. A microresonator for delaying photonic signals of a predetermined frequency, the microresonator comprising:

a microresonator cavity; and a photonic bandgap delay apparatus disposed within said microresonator cavity and having a predetermined plurality of first and second alternating layers which exhibit a series of photonic bandgaps, said first and second alternating layers having predetermined thicknesses and having predetermined indices of refraction, wherein said predetermined plurality, said predetermined thicknesses and said predetermined indices of refraction cooperate to produce a photonic band edge transmission resonance in said plurality of first and second alternating layers having a photonic band edge transmission resonance center frequency corresponding to said predetermined frequency, to thereby delay the photonic signals during each pass through said microresonator cavity.

8. A microresonator according to claim 7 wherein the photonic signals have a predetermined bandwidth, and wherein said photonic bandgap delay apparatus has a corresponding photonic band edge resonance bandwidth which is at least as wide as the predetermined bandwidth of the photonic signals.

9. A microresonator according to claim 7 further comprising means, disposed within said microresonator cavity, for amplifying the photonic signals.

10. A microresonator according to claim 7 further comprising means, disposed within said microresonator cavity, for adjusting the phase of the photonic signals.

11. A microresonator according to claim 7 wherein the photonic signals are optical pulses having a predetermined shape, and wherein the microresonator further comprises means, disposed within said microresonator cavity, for at least partially reshaping the optical pulses.

12. A microresonator according to claim 7 wherein the photonic signals are optical pulses having a predetermined pulse length, wherein said microresonator cavity is defined by a pair of spaced apart mirrors, and wherein said photonic bandgap delay apparatus is spaced by at least one-half of the predetermined pulse length of the optical pulses from each of said pair of mirrors.

13. A microresonator according to claim 12 wherein said plurality of first and second layers of said photonic bandgap delay apparatus are generally parallel to each other and to said pair of mirrors.

14. A microresonator according to claim 7 wherein said plurality of first and second layers of said photonic bandgap delay apparatus produce a plurality of photonic band edge resonances for each photonic bandgap at a plurality of frequencies extending away from the corresponding photonic bandgap, and wherein said predetermined plurality, said predetermined thicknesses and said predetermined indices of refraction cooperate to produce a photonic band edge transmission resonance in said plurality of first and second alternating layers, corresponding to one of said plurality of frequencies which is closest to a bandgap, and having a photonic band edge transmission resonance center frequency corresponding to said predetermined frequency.

15. A microresonator according to claim 7 wherein said plurality of first and second layers of said photonic bandgap delay apparatus comprise a plurality of alternating layers of aluminum arsenide and gallium arsenide.

16. A microresonator according to claim 7 further comprising means for varying the index of refraction of at least one of said first and second alternating layers of said photonic bandgap delay apparatus to thereby vary the delay imparted to the photonic signals.

17. A microresonator according to claim 7 wherein said predetermined thicknesses and said predetermined plurality of said first and second alternating layers of said photonic bandgap delay apparatus are described by a solution of the following two simultaneous equations: $1/T_{12}=[1+\cos \pi/N \cos \pi/(2N)]/[1-\cos (\pi\Delta\omega/\omega_0) \cos (\pi\omega/\omega_0)]$ $1/T_{12}=[\sin \pi/N \sin \pi/(2N)]/[\sin (\pi\Delta\omega/\omega_0)\sin(\pi\omega/\omega_0)]$ where $T_{12}=4n_1n_2/(n_1+n_2)^2$, $n_1$ is the index of refraction of said first alternating layers, $n_2$ is the index of refraction of said second alternating layers, $N$ is said predetermined plurality, $\omega_0$ is the mid-gap frequency of said photonic bandgap structure, and $a=\pi c/(2\omega_0 n_1)$ and $b=\pi c/(2\omega_0 n_2)$, where a is said predetermined thickness of said first alternating layers, b is said predetermined thickness of said second alternating layers and c is the free space speed of light.

18. A microresonator for delaying photonic signals of a predetermined frequency, the microresonator comprising:

a microresonator cavity; and a photonic bandgap delay apparatus disposed within said microresonator cavity and having a predetermined plurality of unit cells which exhibit a series of photonic bandgaps, said predetermined plurality of unit cells each having a predetermined thickness and having a variable index of refraction, wherein said predetermined plurality and said predetermined thickness cooperate to produce a photonic band edge transmission resonance in said plurality of unit cells having a photonic band edge transmission resonance center frequency corresponding to said predetermined frequency, to thereby delay the photonic signals during each pass through said microresonator cavity.

19. A microresonator according to claim 18 wherein the photonic signals have a predetermined bandwidth, and wherein said photonic bandgap delay apparatus has a corresponding photonic band edge resonance bandwidth which is at least as wide as the predetermined bandwidth of the photonic signals.

20. A microresonator according to claim 18 further comprising means, disposed within said microresonator cavity, for amplifying the photonic signals.

21. A microresonator according to claim 18 further comprising means, disposed within said microresonator cavity, for adjusting the phase of the photonic signals.

22. A microresonator according to claim 18 wherein the photonic signals are optical pulses having a predetermined shape, and wherein the microresonator further comprises means, disposed within said microresonator cavity, for at least partially reshaping the optical pulses.

23. A microresonator according to claim 18 wherein the photonic signals are optical signals having a predetermined pulse length, wherein said microresonator cavity is defined by a pair of spaced apart mirrors, and wherein said photonic bandgap delay apparatus is spaced by at least one-half of the predetermined pulse length of the optical pulses from each of said pair of mirrors.

24. A microresonator according to claim 23 wherein said plurality of unit cells of said photonic bandgap delay apparatus are generally parallel to each other and to said pair of mirrors.

25. A microresonator according to claim 18 wherein said plurality of unit cells of said photonic bandgap delay apparatus produce a plurality of photonic band edge resonances for each photonic bandgap, at a plurality of frequencies extending away from the corresponding photonic bandgap, and wherein said predetermined plurality and said predetermined thickness cooperate to produce a photonic band edge transmission resonance in said plurality of unit cells, corresponding to one of said plurality of frequencies which is closest to a bandgap, and having a photonic band edge transmission resonance center frequency corresponding to said predetermined frequency.

26. A microresonator according to claim 18 wherein said variable index of refraction of said unit cells of said photonic bandgap delay apparatus is a continuously or discontinuously variable index of refraction which varies across said predetermined thickness of said respective unit cells.

27. A method of delaying photonic signals of a predetermined frequency and a predetermined bandwidth, comprising the steps of:

introducing the photonic signals into a microresonator having a microresonator cavity;

delaying the photonic signals with a photonic bandgap delay apparatus having a photonic band edge resonance at the predetermined frequency of the photonic signals and having a corresponding photonic band edge resonance bandwidth which is at least as wide as the predetermined bandwidth of the photonic signals such that the photonic signals are delayed during each pass through the microresonator cavity; and permitting the photonic signals to exit the microresonator cavity once the photonic signals have been delayed.

28. A method according to claim 27 further comprising the step of amplifying the photonic signals within the microresonator cavity.

29. A method according to claim 27 further comprising the step of adjusting the phase of the photonic signals within the microresonator cavity.

30. A method according to claim 27 wherein the photonic signals are optical pulses having a predetermined shape, and wherein the method further comprises the step of at least partially reshaping the optical pulses within the microresonator cavity.

31. A method according to claim 27 further comprising the steps of:

splitting the photonic signals into photonic subsignals within the microresonator cavity;

separately delaying each photonic subsignal; and combining the delayed photonic subsignals prior to permitting the resulting photonic signals to exit the microresonator cavity.

32. A method of delaying photonic signals comprising the steps of:

applying the photonic signals to a microresonator having a pair of switchable mirrors that are spaced apart to define a microresonator cavity therebetween and a photonic bandgap delay apparatus disposed within the microresonator cavity;

switching one of the mirrors to a transmissive state to permit the applied photonic signals to enter the microresonator cavity;

switching the pair of mirrors to a reflective state such that the photonic signals reflect between the mirrors and make a plurality of passes through the microresonator cavity;

delaying the photonic signals with the photonic bandgap delay apparatus during each pass through the microresonator cavity; and switching one of the mirrors to a transmissive state to permit the photonic signals to exit the microresonator cavity once the photonic signals have been delayed.

33. A method according to claim 32 wherein said applying step comprises applying photonic signals which have a predetermined frequency and a predetermined bandwidth to the microresonator, and wherein the photonic bandgap delay apparatus has a photonic band edge resonance at the predetermined frequency of the photonic signals and a corresponding photonic band edge resonance bandwidth which is at least as wide as the predetermined bandwidth of the photonic signals, to thereby impart a predetermined delay to the photonic signals which pass through the microresonator cavity.

34. A method according to claim 32 further comprising the step of amplifying the photonic signals within the microresonator cavity.

35. A method according to claim 32 further comprising the step of adjusting the phase of the photonic signals within the microresonator cavity.

36. A method according to claim 32 wherein the photonic signals are optical pulses having a predetermined shape, and wherein the method further comprises the step of at least partially reshaping the optical pulses within the microresonator cavity.

37. A method according to claim 32 further comprising the steps of:

splitting the photonic signals into photonic subsignals within the microresonator cavity;

separately delaying each photonic subsignal; and combining the delayed photonic subsignals prior to permitting the resulting photonic signals to exit the microresonator cavity.

* * * * *